United States Patent
Low

(10) Patent No.: US 11,075,576 B2
(45) Date of Patent: *Jul. 27, 2021

(54) APPARATUS AND METHOD FOR EFFICIENT SHUTDOWN OF ADIABATIC CHARGE PUMPS

(71) Applicant: pSemi Corporation, San Diego, CA (US)

(72) Inventor: Aichen Low, Cambridge, MA (US)

(73) Assignee: pSemi Corporation, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/880,507

(22) Filed: May 21, 2020

(65) Prior Publication Data
US 2020/0343808 A1     Oct. 29, 2020

Related U.S. Application Data

(63) Continuation of application No. 16/291,766, filed on Mar. 4, 2019, now Pat. No. 10,686,367.

(51) Int. Cl.
*H02M 1/36* (2007.01)
*H02M 3/158* (2006.01)
(Continued)

(52) U.S. Cl.
CPC ............... *H02M 1/36* (2013.01); *H02M 3/07* (2013.01); *H02M 3/158* (2013.01); *H02M 2001/0009* (2013.01)

(58) Field of Classification Search
CPC ............ H02M 1/36; H02M 3/07; H02M 3/06; H02M 3/24; H02M 3/073; H02M 3/158;
(Continued)

(56) References Cited

U.S. PATENT DOCUMENTS

| 4,214,174 A | 7/1980 | Dickson |
| 4,812,961 A | 3/1989 | Essaff et al. |

(Continued)

FOREIGN PATENT DOCUMENTS

| EP | 0773622 | 5/1997 |
| JP | 10327573 | 12/1998 |

(Continued)

OTHER PUBLICATIONS

Low, et al., Preliminary Amendment filed in the USPTO dated Sep. 14, 2016 for U.S. Appl. No. 15/126,050, 7 pgs.

(Continued)

*Primary Examiner* — Adolf D Berhane
(74) *Attorney, Agent, or Firm* — Jaquez Land Greenhaus & McFarland LLP; Alessandro Steinfl, Esq.

(57) ABSTRACT

An apparatus and method for efficient shutdown of adiabatic charge pumps. A power converter includes a charge pump, a controller, an output load and an inductor. According to one aspect, the power converter includes a switch which is connected across the inductor, where the controller is configured to sense a status of the charge pump and to correspondingly drive the switch element. According to another aspect, the charge pump includes an active discharge circuit and a current-sense circuit, where the current-sense circuit is configured to activate the active discharge circuit. According to yet another aspect, the power converter includes a cascade multiplier having a plurality of high side and low side switches, where a pair of high side and low side switches are enabled simultaneously, such that the pair of high side and low side switches act as an active discharge switch for the charge pump.

27 Claims, 14 Drawing Sheets

(51) Int. Cl.
*H02M 3/07* (2006.01)
*H02M 1/00* (2006.01)

(58) Field of Classification Search
CPC ....... H02M 3/1584; H02M 2001/0009; H02M 2003/072
See application file for complete search history.

(56) References Cited

U.S. PATENT DOCUMENTS

| | | | |
|---|---|---|---|
| 5,132,606 | A | 7/1992 | Edward |
| 5,301,097 | A | 4/1994 | McDaniel |
| 5,737,201 | A | 4/1998 | Meynard et al. |
| 5,761,058 | A | 6/1998 | Kanda et al. |
| 5,801,987 | A | 9/1998 | Dinh |
| 5,907,484 | A | 5/1999 | Kowshik et al. |
| 5,978,283 | A | 11/1999 | Hsu et al. |
| 6,107,864 | A | 8/2000 | Fukushima et al. |
| 6,476,666 | B1 | 11/2002 | Palusa et al. |
| 6,486,728 | B2 | 11/2002 | Kleveland |
| 6,501,325 | B1 | 12/2002 | Meng |
| 6,504,422 | B1 | 1/2003 | Rader et al. |
| 6,759,766 | B2 | 7/2004 | Hiratsuka et al. |
| 6,927,441 | B2 | 8/2005 | Pappalardo et al. |
| 6,980,181 | B2 | 12/2005 | Sudo |
| 7,145,382 | B2 | 12/2006 | Ker et al. |
| 7,190,210 | B2 | 3/2007 | Azrai et al. |
| 7,224,062 | B2 | 5/2007 | Hsu |
| 7,239,194 | B2 | 7/2007 | Azrai et al. |
| 7,250,810 | B1 | 7/2007 | Tsen |
| 7,408,330 | B2 | 8/2008 | Zhao |
| 7,511,978 | B2 | 3/2009 | Chen et al. |
| 7,595,682 | B2 | 9/2009 | Lin et al. |
| 7,724,551 | B2 | 5/2010 | Yanagida et al. |
| 7,777,459 | B2 | 8/2010 | Williams |
| 7,782,027 | B2 | 8/2010 | Williams |
| 7,786,712 | B2 | 8/2010 | Williams |
| 7,807,499 | B2 | 10/2010 | Nishizawa |
| 7,812,579 | B2 | 10/2010 | Williams |
| 7,928,705 | B2 | 4/2011 | Hooijschuur et al. |
| 7,999,601 | B2 | 8/2011 | Schlueter et al. |
| 8,018,216 | B2 | 9/2011 | Kakehi |
| 8,040,174 | B2 | 10/2011 | Likhterov |
| 8,048,766 | B2 | 11/2011 | Joly et al. |
| 8,111,054 | B2 | 2/2012 | Yen et al. |
| 8,120,934 | B2 | 2/2012 | Pauritsch et al. |
| 8,159,091 | B2 | 4/2012 | Yeates |
| 8,193,604 | B2 | 6/2012 | Lin et al. |
| 8,212,541 | B2 | 7/2012 | Perreault et al. |
| 8,339,184 | B2 | 12/2012 | Kok et al. |
| 8,350,549 | B2 | 1/2013 | Kitabatake |
| 8,354,828 | B2 | 1/2013 | Huang et al. |
| 8,384,467 | B1 | 2/2013 | O'Keeffe et al. |
| 8,395,914 | B2 | 3/2013 | Klootwijk et al. |
| 8,456,874 | B2 | 6/2013 | Singer et al. |
| 8,503,203 | B1 | 8/2013 | Szczeszynski et al. |
| 8,619,445 | B1 | 12/2013 | Low et al. |
| 8,643,347 | B2 | 2/2014 | Giuliano et al. |
| 8,723,491 | B2 | 5/2014 | Giuliano |
| 8,803,492 | B2 | 8/2014 | Liu |
| 8,817,501 | B1 | 8/2014 | Low et al. |
| 9,007,092 | B2 * | 4/2015 | Kozuma ............ H03K 19/0013 326/38 |
| 9,559,589 | B2 | 1/2017 | Petersen |
| 9,742,266 | B2 | 8/2017 | Giuliano et al. |
| 10,128,745 | B2 | 11/2018 | Low et al. |
| 10,374,511 | B2 | 8/2019 | Salem et al. |
| 10,389,236 | B1 | 8/2019 | Low et al. |
| 10,686,367 | B1 * | 6/2020 | Low ........................ H02M 1/36 |
| 2002/0008567 | A1 | 1/2002 | Henry |
| 2003/0169096 | A1 | 9/2003 | Hsu et al. |
| 2003/0227280 | A1 | 12/2003 | Vinciarelli |
| 2004/0041620 | A1 | 3/2004 | D'Angelo et al. |
| 2005/0007184 | A1 | 1/2005 | Kamijo |
| 2005/0207133 | A1 | 9/2005 | Pavier et al. |
| 2007/0210774 | A1 | 9/2007 | Kimura et al. |
| 2007/0230221 | A1 | 10/2007 | Lim et al. |
| 2008/0150621 | A1 | 6/2008 | Lesso et al. |
| 2008/0157732 | A1 | 7/2008 | Williams |
| 2008/0157733 | A1 | 7/2008 | Williams |
| 2008/0158915 | A1 | 7/2008 | Williams |
| 2008/0239772 | A1 | 10/2008 | Oraw et al. |
| 2008/0284398 | A1 | 11/2008 | Qiu et al. |
| 2008/0291711 | A1 | 11/2008 | Williams |
| 2009/0059630 | A1 | 3/2009 | Williams |
| 2009/0102439 | A1 | 4/2009 | Williams |
| 2009/0174383 | A1 | 7/2009 | Tsui et al. |
| 2009/0257211 | A1 | 10/2009 | Kontani et al. |
| 2009/0278520 | A1 | 11/2009 | Perreault et al. |
| 2009/0322414 | A1 | 12/2009 | Oraw et al. |
| 2010/0110741 | A1 | 5/2010 | Lin et al. |
| 2010/0140736 | A1 | 6/2010 | Lin et al. |
| 2010/0202161 | A1 | 8/2010 | Sims et al. |
| 2010/0214746 | A1 | 8/2010 | Lofti et al. |
| 2010/0244189 | A1 | 9/2010 | Klootwijk et al. |
| 2010/0244585 | A1 | 9/2010 | Tan et al. |
| 2011/0026275 | A1 | 2/2011 | Huang et al. |
| 2011/0163414 | A1 | 7/2011 | Lin et al. |
| 2011/0204858 | A1 | 8/2011 | Kudo |
| 2011/0204959 | A1 | 8/2011 | Sousa et al. |
| 2012/0119718 | A1 | 5/2012 | Song |
| 2012/0139515 | A1 | 6/2012 | Li |
| 2012/0146177 | A1 | 6/2012 | Choi et al. |
| 2012/0153907 | A1 | 6/2012 | Carobolante et al. |
| 2012/0170334 | A1 | 7/2012 | Menegoli et al. |
| 2012/0313602 | A1 | 12/2012 | Perreault et al. |
| 2012/0326684 | A1 | 12/2012 | Perreault et al. |
| 2013/0049714 | A1 | 2/2013 | Chiu |
| 2013/0069614 | A1 | 3/2013 | Tso et al. |
| 2013/0094157 | A1 | 4/2013 | Giuliano |
| 2013/0154600 | A1 | 6/2013 | Giuliano |
| 2013/0229841 | A1 | 9/2013 | Giuliano |
| 2014/0070787 | A1 | 3/2014 | Amo |
| 2014/0152388 | A1 | 6/2014 | Lesso et al. |
| 2014/0159681 | A1 | 6/2014 | Oraw et al. |
| 2014/0340158 | A1 | 11/2014 | Thandri et al. |
| 2016/0049861 | A1 | 2/2016 | Ihs et al. |
| 2016/0197552 | A1 | 7/2016 | Giuliano |
| 2017/0085172 | A1 | 3/2017 | Low |
| 2017/0244318 | A1 | 8/2017 | Giuliano |
| 2020/0141993 | A1 * | 5/2020 | Nikic ................... G03G 13/025 |
| 2020/0161976 | A1 | 5/2020 | Song et al. |

FOREIGN PATENT DOCUMENTS

| | | |
|---|---|---|
| JP | 11235053 | 8/1999 |
| JP | 2006067783 | 3/2006 |
| JP | 2010045943 | 2/2010 |
| KR | 20110061121 | 6/2011 |
| WO | 2006093600 | 9/2006 |
| WO | 2009112900 | 9/2009 |
| WO | 2012151466 | 11/2012 |
| WO | M13059446 | 4/2013 |
| WO | M13096416 | 6/2013 |

OTHER PUBLICATIONS

Almo, Khareem S. Office Action received from the USPTO dated Dec. 1, 2017 for U.S. Appl. No. 15/126,050, 18 pgs.

Low, et al., Amendment filed in the USPTO dated May 1, 2018 for U.S. Appl. No. 15/126,050, 9 pgs.

Almo, Khareem S. Notice of Allowance received from the USPTO dated Jul. 18, 2018 for U.S. Appl. No. 15/126,050, 9 pgs.

Abutbul, et al., "Step-Up Switching-Mode Converter with High Voltage Gain Using a Switched-Capacitor Circuit", IEEE Transactions on Circuits and Systems—I: Fundamental Theory and Applications, Vo. 50, No. 8, Aug. 2003, pp. 1098-1102 (5 pgs.).

Axelrod, et al., "Single-Switch Single-Stage Switched-Capacitor Buck Converter", Proc. of NORPIE 2004, 4th Nordic Workshop on Power and Industrial Electronics, Jun. 2004, 5 pgs.

Cervera, et al., "A High Efficiency Resonant Switched Capacitor Converter with Continuous Conversion Ratio", Energy Conversation Congress and Exposition (ECCE), Sep., 2013, pp. 4969-4976, 8 pgs.

(56) References Cited

OTHER PUBLICATIONS

Han, et al., "A New Approach to Reducing Output Ripple in Switched-Capacitor-Based Step-Down DC-DC Converters", IEEE Transactions on Power Electronics, vol. 21, No. 6, Nov. 2006, pp. 1548-1555, 8 pgs.

Lei, et al., "Analysis of Switched-Capacitor DC-DC Converters in Soft-Charging Operation", 2013 Compel—14th IEEE Workshop on Control and Modeling for Power Electronics, 7 pgs., Jun. 23, 2013.

Linear Technology data sheet for part LTC3402, "2A, 3MHz Micropower Synchronous Boost Converter", 2000.

Ma, et al., "Design and Optimization on Dynamic Power System for Self-Powered Integrated Wireless Sensing Nodes" ACM ISLPED '05 conference (published at pp. 303-306 of the proceedings)., 4 pgs.

Makowski, et al., "Performance Limits of Switched-Capacitor DC-DC Converters", IEEE PECS '95 Conference, 1995, 7 pgs.

Meynard, et al., "Multi-Level Conversion: High Voltage Choppers and Voltage-Source Inverters", IEEE Power Electronics Specialists Conference, pp. 398-403, 1992, 7 pgs.

Middlebrook, R.D., "Transformless DC-to-DC Converters with Large Conversion Ratios", IEEE Transactions on Power Electronics, vol. 3, No. 4, Oct. 1988, pp. 484-488, 5 pgs.

Ng, et al., "Switched Capacitor DC-DC Converter: Superior Where the Buck Conveter has Dominated", PhD Thesis, UC Berkeley, Aug. 17, 2011, 141 pgs.

Ottman, et al., "Optimized Piezoelectric Energy Harvesting Circuit Using Step-Down Converter in Discontinuous Conduction Mode", IEEE Power Electronics Specialists Conference, pp. 1988-1994, 2002, 7 pgs.

Pilawa-Podgurski, et al. "Merged Two-Stage Power Converter Architecture with Soft Charging Switched-Capacitor Energy Transfer", 39th IEEE Power Electronics Specialists Conference, 2008, 8 pgs.

Pilawa-Podgurski, et al. "Merged Two-Stage Power Converter with Soft Charging Switched-Capacitor Stage in 180 nm CMOS", IEEE Journal of Solid-State Circuits, vol. 47, No. 7, Jul. 2012, pp. 1557-1567, 11 pgs.

Starzyk, et al., "A DC-DC Charge Pump Design Based on Voltage Doublers", IEEE Transactions on Circuits and Systems—I: Fundamental Theory and Applications, vol. 48, No. 3, Mar. 2001, pp. 350-359, 10 pgs.

Sun, et al., "High Power Density, High Efficiency System Two-Stage Power Architecture for Laptop Computers", Power Electronics Specialists Conference, pp. 1-7, Jun. 2006, 7 pgs.

Texas Instruments data sheet for part TPS54310, "3-V to 6-V Input, 3-A Output Synchronous-Buck PWM Switcher with Integrated FETs", dated 2002-2005, 17 pgs.

Umeno, et al., "A New Approach to Low Ripple-Noise Switching Converters on the Basis of Switched-Capacitor Convertes", IEEE International Symposium on Circuits and Systems, vol. 2, pp. 1077-1080, Jun. 1991, 4 pgs.

Wood, et al., "Design, Fabrication and Initial Results of a 2g Autonomous Glider", IEEE Industrial Electronics Society, pp. 1870-1877, Nov. 2005, 8 pgs.

Xu, et al., "Voltage Divider and its Application in the Two-Stage Power Architecture", IEEE Twenty-First Annual IEEE Applied Power Electronics Conference and Exposition, pp. 499-504, Mar. 2006, 7 pgs.

Berhane, Adolf D., Office Action received from the USPTO dated Oct. 17, 2019 for U.S. Appl. No. 16/291,766, 31 pgs.

Berhane, Adolf D., Notice of Allowance received from the USPTO dated Feb. 10, 2020 for U.S. Appl. No. 16/291,766, 8 pgs.

\* cited by examiner

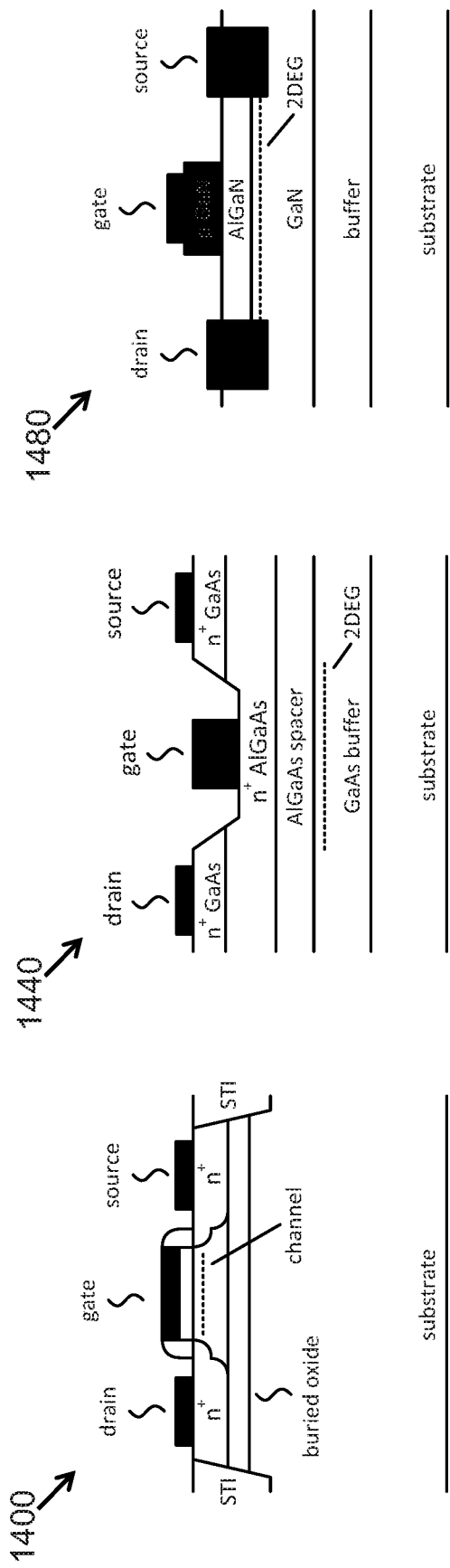

APPARATUS AND METHOD FOR EFFICIENT SHUTDOWN OF ADIABATIC CHARGE PUMPS

CROSS-REFERENCE TO RELATED APPLICATIONS—CLAIM OF PRIORITY

This application is a continuation of, and claims the benefit of priority under 35 USC § 120 of, commonly assigned and co-pending prior U.S. application Ser. No. 16/291,766, filed Mar. 4, 2019, "Apparatus and Method for Efficient Shutdown of Adiabatic Charge Pumps", the disclosure of which is incorporated herein by reference in its entirety.

The present application may be related to U.S. Patent Publication No. 2017/0085172 A1 published on Mar. 23, 2017, entitled "Charge Balanced Charge Pump Control", the contents of which are herein incorporated by reference in their entirety.

BACKGROUND

(1) Technical Field

The present teachings generally relate to power converters, and more specifically to a method and apparatus for the shut-down of a charge pump in a power converter.

(2) Background

FIG. 1 shows a known adiabatic step-down power converter. The adiabatic step-down power converter includes a charge pump and an adiabatic element. In a step-down power converter, the output voltage of the charge pump is less than the input voltage of the charge pump. Shutting down or disablement within an adiabatic charge pump while the output load current is non-zero introduces new challenges, compared to the shut-down or disablement of a non-adiabatic charge pump. In FIG. 2 the adiabatic element is shown to include an inductor. In the adiabatic charge pump, the inductor current must discharge from the output load level to zero upon shutting down or disablement.

The challenges encountered during the shutdown or disablement of adiabatic step-down power converter include, for example, issues such as i) which path through the charge pump does the inductor current take when discharging, and whether this discharge path is safe and/or whether mitigating strategies regarding the path of the discharging inductor current are efficient in terms of die area, system area and/or component count, and ii) oscillation at node Vx after the discharge of the inductor current. Node Vx may oscillate with a magnitude and frequency that depends on the discharge path and the parasitics associated with the discharge path. Under certain circumstances, the oscillation of node Vx may exceed the safe voltage rating of the transistors used as switches within the charge pump.

Accordingly, there is a need for an apparatus and method for efficient shutdown of adiabatic charge pumps.

SUMMARY

The present disclosure provides solutions regarding the path of discharging inductor current that are efficient in terms of die area, system area and/or component count, and solutions to safely shut down a charge pump. Various embodiments of a method and apparatus for efficient shut-down of adiabatic charge pumps are disclosed.

In one disclosed embodiment, a power converter is implemented on an integrated circuit (IC). The power converter includes a charge pump, an electro-static discharge (ESD) element at the output of the charge pump, an adiabatic element such as an inductor, and a controller circuit. The power converter provides a stable output voltage to the load. Shutting down or disabling of the adiabatic charge pump while the output load current is non-zero introduces issues such as i) which path through the charge pump does the inductor current take when discharging, and whether this discharge path is safe and/or whether mitigating strategies regarding the path of the discharging inductor current are efficient in terms of die area, system area and/or component count, and ii) oscillation at node Vx after the discharge of the inductor current. To mitigate these issues, a switch is introduced which connects across the inductor. This switch can be opened or closed according to a control signal from the controller. During the adiabatic operation of the charge pump, the switch is kept in the open position. Prior to the shutdown of the charge pump, a control signal places the switch in a closed position, thus disabling the adiabatic operation. As the switch closes while the power converter is still operating, the current in the inductor decreases towards zero while the current through the switch increases. Thus, the sum of the currents through the adiabatic element remains equal to the output load current. In this manner, when a control signal is sent to discharge the charge pump, the inductor has already fully or mostly discharged, and there will be very little, if any, subsequent ringing of the voltage at node Vx. The controller can even use an alternate signal to close the switch in a gradual or controlled manner, in order to minimize the transients on the output voltage during the switch over of current from the inductor to the switch.

In another embodiment, the passive ESD element at the output of the charge pump is replaced by an active ESD element. The active ESD element is controlled such that it acts as an ESD element except upon the shutdown of the charge pump when it carries the inductor discharge current, thus preventing the issues of oscillation at node Vx and unsafe discharge of the inductor current.

In yet another embodiment, a shutdown control-sequence is applied to some of the control signals provided by the controller circuit. In this embodiment, an existing pair of switches, including a low-side switch and a high-side switch within the charge pump, is simultaneously enabled, thus causing a shoot-through condition. This pair of switches effectively acts like an active discharge switch. Therefore, the inductor current is safely discharged, and undesired ringing at node Vx is avoided.

In an alternate embodiment, the power converter controls its own output load current. In this embodiment, in response to receiving a command to shut down the power converter, the controller sends commands to a load in order to decrease the magnitude of the current drawn by the load. Thus, voltage transients at the output of the power converter are minimized because the load current is reduced over a transition time prior to the shutdown of the charge pump. The inductor current is at or close to zero when the charge pump is shut down. This embodiment can be particularly useful in applications for light emitting diodes (LED), where a programmable current sink can control the total current drawn by the LED load, which is also the power converter output load current.

In yet another alternate embodiment, an circuital arrangement is presented, the circuital arrangement comprising a charge pump having a controller, a cascade multiplier having a plurality of high side and low side switches, wherein the controller is configured to receive a pair of external signals, and to correspondingly drive the plurality of high side and low side switches in the cascade multiplier, and a first pair of high side and low side switches from the plurality of high side and low side switches are enabled simultaneously, such that the first pair of high side and low side switches act as an active discharge switch for the charge pump.

BRIEF DESCRIPTION OF THE DRAWINGS

The disclosed method and apparatus, in accordance with one or more various embodiments, are described with reference to the following figures. The drawings are provided for purposes of illustration only and merely depict examples of some embodiments of the disclosed method and apparatus. These drawings are provided to facilitate the reader's understanding of the disclosed method and apparatus. They should not be considered to limit the breadth, scope, or applicability of the claimed invention.

FIG. 14A shows a cross-section of an n-type MOSFET in a silicon-on-insulator process technology.

FIG. 14B shows a cross-section of a depletion-mode GaAs transistor.

FIG. 14C shows a cross-section of an enhancement-mode GaN HEMT.

Like reference numbers and designations in the various drawings indicate like elements.

DETAILED DESCRIPTION

Figure 1:
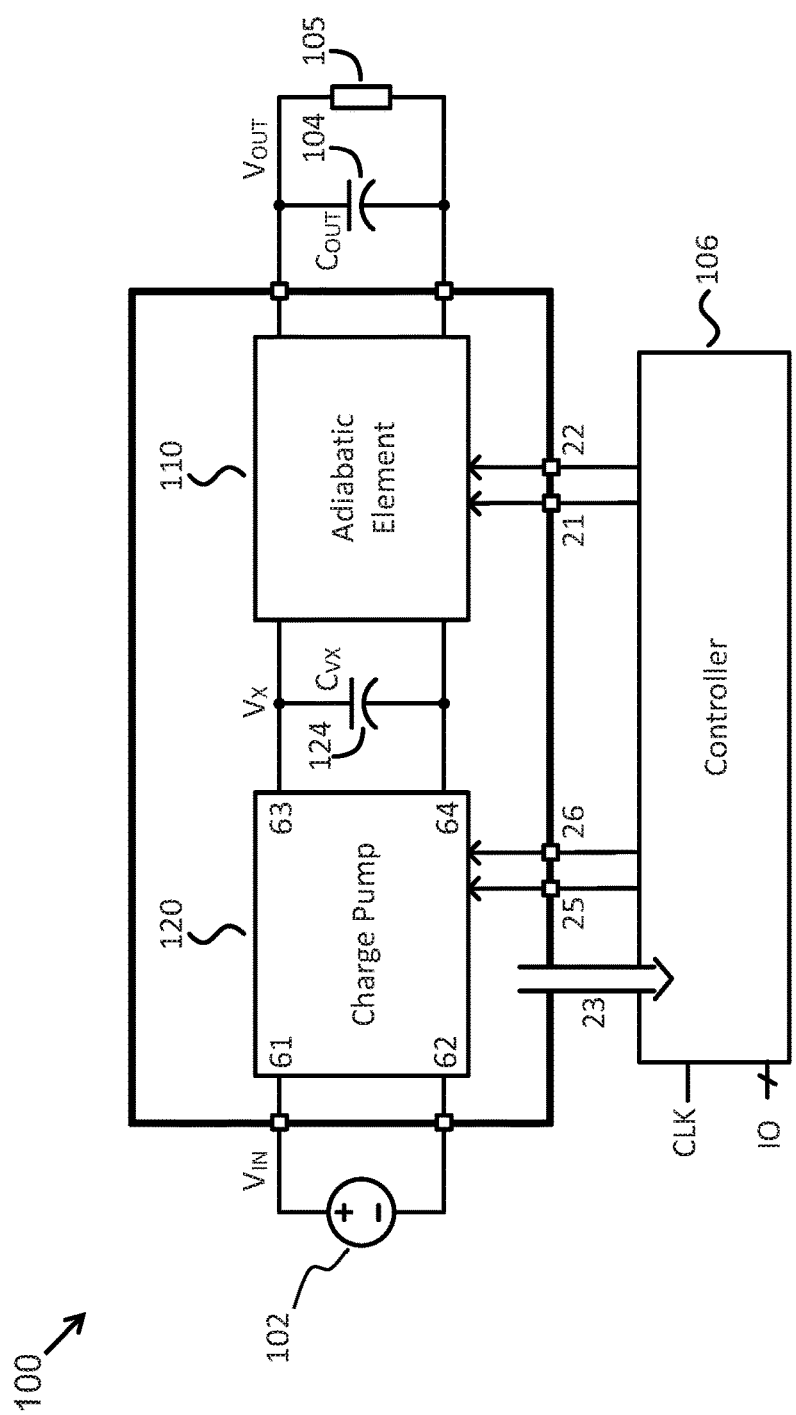
FIG. 1 shows a known block diagram of a step-down power converter, which includes a charge pump and an adiabatic element.

FIG. 1 shows a power converter 100. The power converter 100 receives an input voltage VIN provided by a voltage source 102, transforms it into an output voltage VOUT at an output capacitor 104 across which is connected a load 105. The power converter 100 includes a controller 106, a charge pump 120, and an adiabatic element 110 in series between the output voltage VOUT and the charge pump 120. The power converter 100 is a step-down power converter. Accordingly, the output voltage VOUT is lower than the input voltage VIN.

Electronic devices typically demand a stable DC power supply for correct operation. In many circuits, the power that is available to drive the circuit may not be in a form that the circuit demands. To correct this, it is useful to provide a power converter that converts the available power into a form that conforms to the circuit's requirements. One common type of power converter is a switch-mode power converter. A switch-mode power converter produces an output voltage by switching reactive circuit elements into different electrical configurations using a switch network. A switched capacitor power converter is a type of switch-mode power converter that primarily utilizes capacitors to transfer energy. Such converters are called "charge pumps".

In particular, the charge pump 120 receives the input voltage VIN, generates an intermediate voltage VX that is lower than the input voltage VIN, across an intermediate capacitor 124, and then provides that intermediate voltage VX to the adiabatic element 110. The adiabatic element 110 then transforms the intermediate voltage VX into an output voltage VOUT. The inclusion of the adiabatic element 110 allows the charge pump 120 to charge adiabatically.

The controller 106 receives a set of input signals and produces a set of output signals. Some of these input signals arrive along an input-signal path 23. These input signals carry information that is indicative of the power converter's operation. The controller 106 also receives a clock signal CLK and external signals IO that are either analog, digital, or a combination of both. Based upon the signals that the controller 106 receives, it produces first, second, third, and fourth control signals 25, 26, 21, 22 that together control the operation of the adiabatic element 110 and the charge pump 120.

Examples of charge pumps 120 include Ladder, Dickson, Series-Parallel, Fibonacci, and Doubler, all of which can be adiabatically charged and configured into multi-phase or single-phase networks. A particularly useful charge pump 120 is an adiabatically charged version of a full-wave cascade multiplier. However, diabatically charged versions can also be used.

As used herein, changing the charge on a capacitor "adiabatically" means causing at least some of the charge stored in that capacitor to change by passing it through a non-capacitive element. A positive adiabatic change in charge on the capacitor is considered adiabatic charging while a negative adiabatic change in charge on the capacitor is considered adiabatic discharging. Examples of non-capacitive elements include inductors, magnetic elements, resistors, and combinations thereof.

In some cases, a capacitor can be charged adiabatically for part of the time and diabatically for the rest of the time. Such capacitors are considered to be adiabatically charged. Similarly, in some cases, a capacitor can be discharged adiabatically for part of the time and diabatically for the rest of the time. Such capacitors are considered to be adiabatically discharged.

Diabatic charging includes all charging that is not adiabatic and diabatic discharging includes all discharging that is not adiabatic.

As used herein, an adiabatically charged switching network is a switching network having at least one capacitor that is both adiabatically charged and adiabatically discharged. A diabatically charged switching network is a switching network that is not an adiabatically charged switching network.

Figure 2:
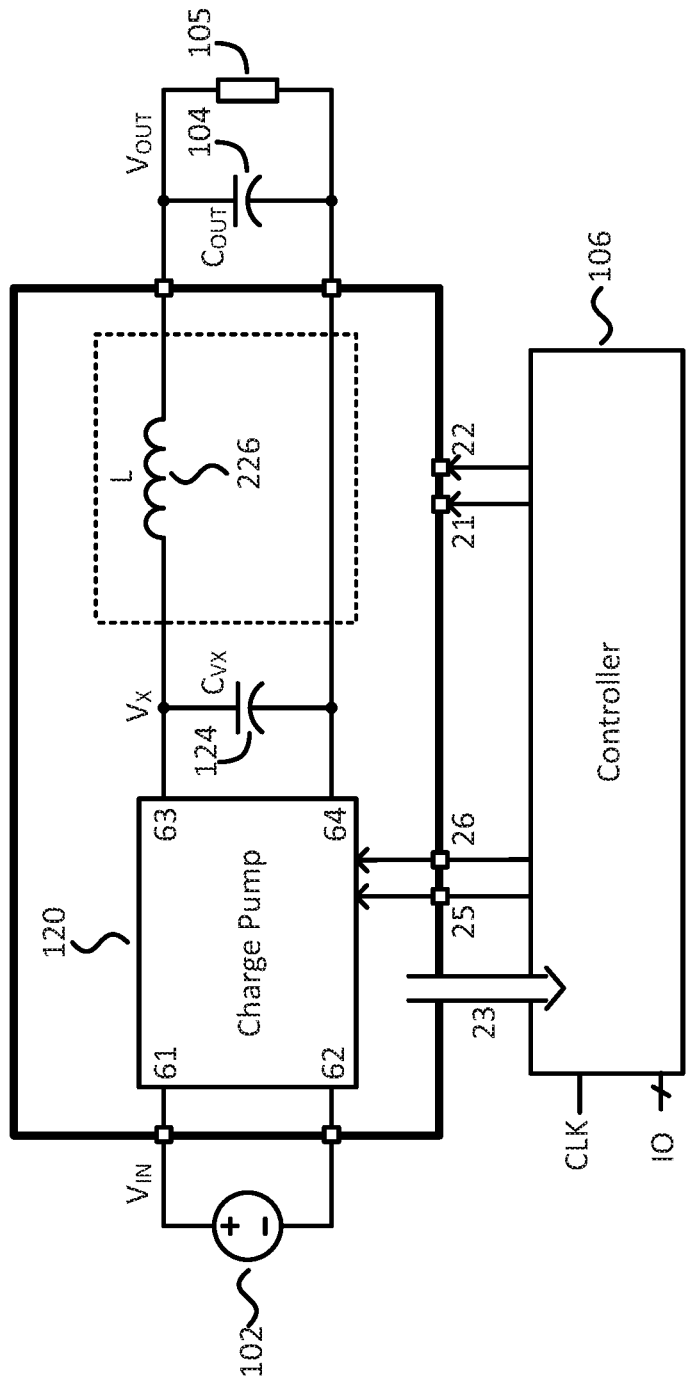
FIG. 2 shows an example of the power converter in FIG. 1, where the adiabatic element includes an inductor.

FIG. 2 shows a particular implementation of the adiabatic element 110 within the context of the step-down power converter 100 shown in FIG. 1. In FIG. 2, the adiabatic element 110 comprises an inductor 226 (L). In this example, the third and fourth control signals 21, 22 from controller 106 are not used. In a shutdown state, when the charge pump 120 neither operates nor switches, the intermediate voltage VX across an intermediate capacitor 124 is equal to the output voltage VOUT across output capacitor 104.

In the following paragraphs, the disclosed method and apparatus, in accordance with one or more various embodiments, are described with reference to the following figures.

Figure 3:
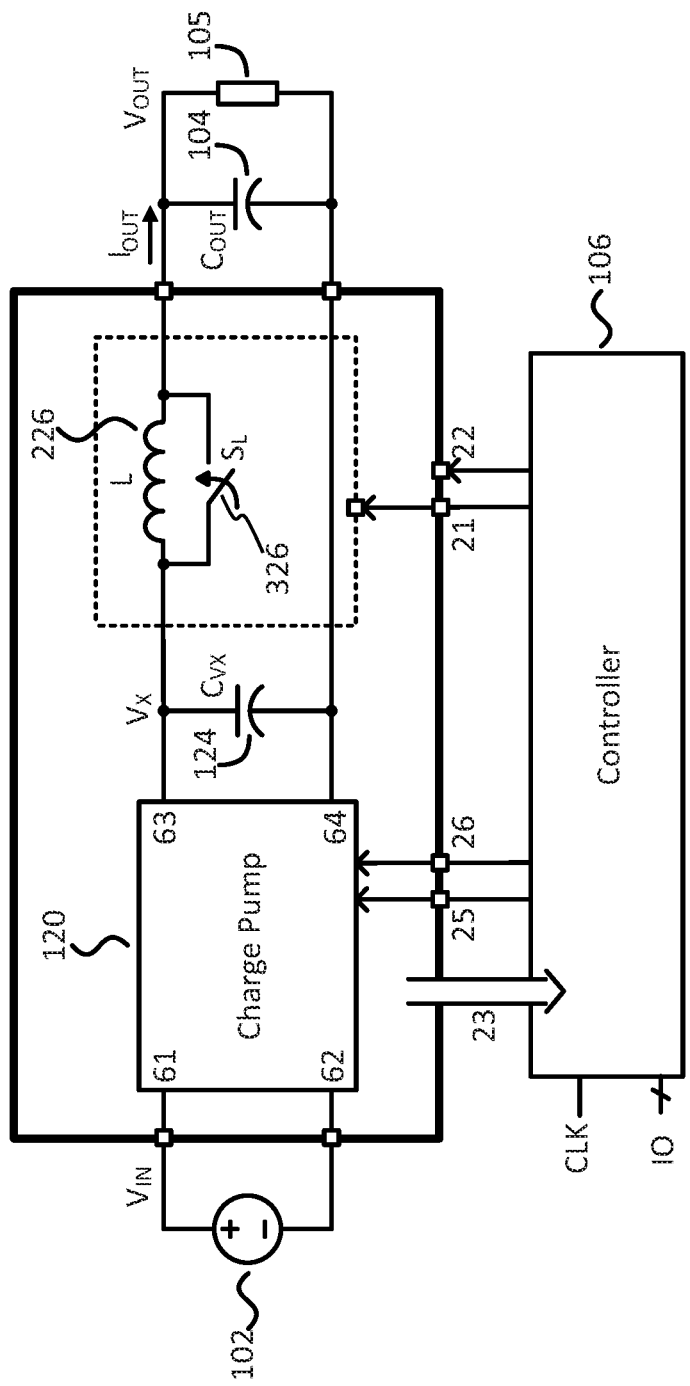
FIG. 3 shows that a switch has been added across the inductor in accordance with one embodiment of the disclosed apparatus.

FIG. 3 shows an inventive implementation of the adiabatic element 110 in accordance with one embodiment of the disclosed apparatus, where a switch 326 ($S_L$) has been added across the inductor 226 (L) in accordance with one embodiment of the disclosed apparatus. In FIG. 3, the switch $S_L$ is connected across the inductor L as part of the adiabatic element 110. The switch $S_L$ can be closed or opened according to the third control signal 21 from controller 106 to disable or allow adiabatic operation of charge pump 120 within power converter 100. In particular, in this embodiment, in order to prevent transient ringing of node Vx and to provide safe discharge of the inductor current, the approach is to disable adiabatic operation prior to the disabling of charge pump 120 switching.

When controller 106 receives an input signal to disable the charge pump 120 switching, either from an input-signal path 23 or from one of the external signals IO, controller 106 can first send the third control signal 21 to close switch $S_L$ before sending the first control signal 25 to disable the charge pump's switching. As the switch $S_L$ closes while the power converter 100 is still operating and delivering current to the output load 105, the current in the inductor L decreases towards zero while the current through switch $S_L$ increases, such that the sum of the currents through the adiabatic element remains equal to the output load current IOUT. When the first control signal 25 is sent to disable the charge pump 120 switching, the inductor current is already at or close to zero, and the inductor will already be fully or mostly discharged, thus there will be very little, if any, subsequent voltage ringing on node Vx. The controller 106 may even use the third control signal 21 to close the switch $S_L$ in a gradual or controlled manner, in order to minimize output voltage VOUT transients during the switchover of current from inductor L to switch $S_L$.

Alternatively, controller 106 can send the third control signal 21 to close switch $S_L$ at the same time as sending the first control signal 25 to disable charge pump 120 switching.

In either case, this method can be applied when the output load current IOUT is either positive (i.e. flowing from power converter 100 towards output load 105) or negative (i.e. flowing from output load 105 towards power converter 100).

The main disadvantage of adding switch $S_L$ lies in the additional die area consumed and the design complexity needed to control its turn-on and turn-off.

Figure 4:
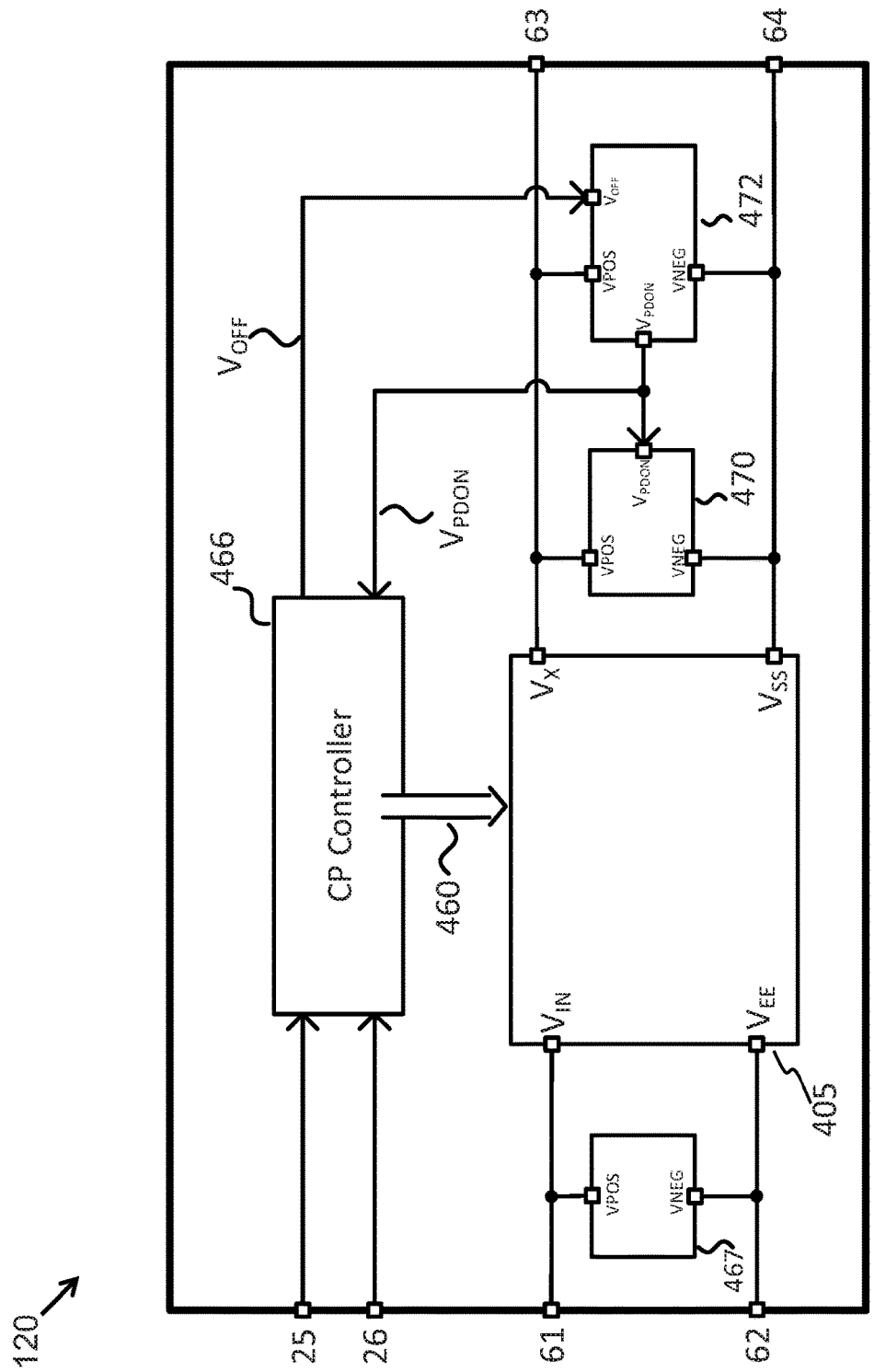
FIG. 4 shows a detailed block diagram where an active discharge circuit and a current-sense circuit have been added in accordance with another embodiment of the disclosed apparatus.

FIG. 4 shows an alternate implementation of charge pump 120 in accordance with another embodiment of the disclosed apparatus. Charge pump 120 receives an input voltage across first and second charge pump terminals 61, 62 and produces an output voltage across third and fourth charge pump terminals 63, 64. The charge pump 120 includes a cascade multiplier 405, a charge pump controller 466, an electro-static discharge (ESD) protection block 467 and a control-signal path 460 from the charge pump controller 466 that includes signals to control the switches within cascade multiplier 405. The charge pump further includes a second ESD protection block which is an active ESD discharge circuit, and includes an active-discharge circuit 470, and a current-sense circuit 472.

A cascade multiplier is a switched-capacitor network that can provide a high conversion gain. As used herein, conversion gain represents a voltage gain if the switched-capacitor network produces an output voltage that is larger than the input voltage, or a current gain if the switched-capacitor network produces an output voltage that is smaller than the input voltage. Energy is transferred from the input to the output by cycling the cascade multiplier through different topological states. Charge is transferred from input voltage to the output voltage via a charge transfer path. The number and configuration of the capacitors in each topological state sets the conversion gain.

Figure 5B:
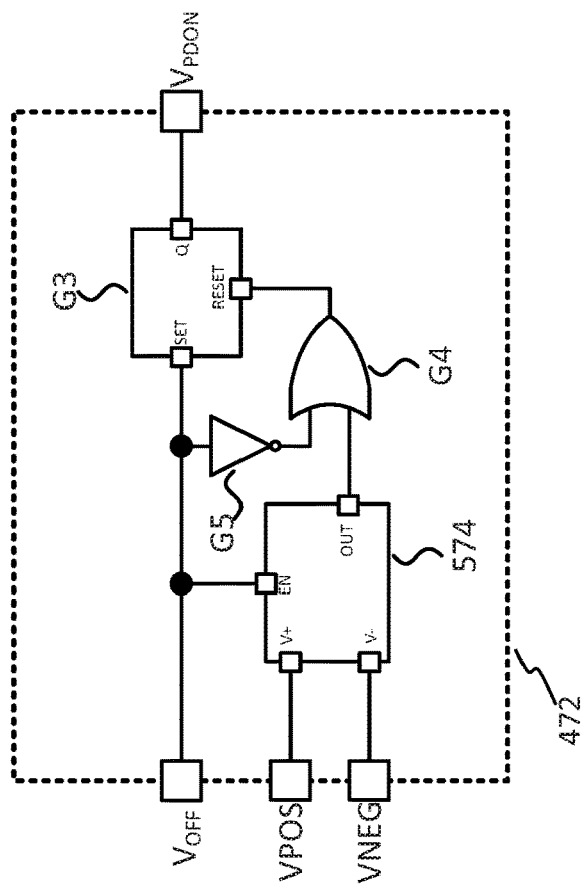
FIG. 5B shows a detailed schematic and block diagram for the current-sense circuit of FIG. 4.
Figure 5A:
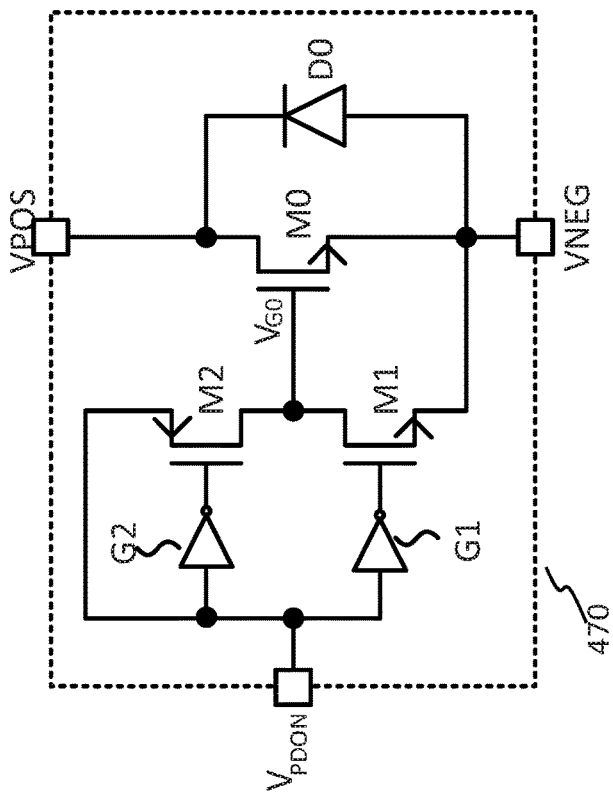
FIG. 5A shows a detailed schematic for the active discharge circuit of FIG. 4.

FIG. 5A shows an example of the active-discharge circuit 470. A first active-discharge terminal, VPOS, connects to both the drain of N-type transistor M0 and the cathode of diode D0. A second active-discharge terminal, VNEG, connects to both the source of N-type transistor M0 and the anode of diode D0. The gate of N-type transistor M0 is driven by either N-type transistor M1 or P-type transistor M2 depending on the logic polarity of the input signal received at third active-discharge terminal $V_{PDON}$. The third active-discharge terminal $V_{PDON}$ connects to the inputs of a first inverter G1 and a second inverter G2 as well as the source of P-type transistor M2. The output of a first inverter G1 connects to the gate of N-type transistor M1 while the output of a second inverter G2 connects to the gate of P-type transistor M2. The first and second active-discharge terminals VPOS and VNEG connect to the charge pump terminals 63 and 64, respectively, as shown in FIG. 4.

When the input received at the third active-discharge terminal $V_{PDON}$ (see FIG. 5A) is logic-low, the output of a first inverter G1 turns on the N-type transistor M1, which pulls the gate of N-type transistor M0 low and turns it off. The P-type transistor M2 is off because of second inverter G2, and the fact that the M2 source is biased low by the input received at third active-discharge terminal $V_{PDON}$. In this first biasing state, the active-discharge circuit 470 is functionally similar to the later described FIG. 7B implementation of an ESD protection block. Therefore in this first biasing state, the active-discharge circuit 470 may be used for ESD protection across the third and fourth charge pump terminals 63, 64. The diode D0 allows current flow through the active-discharge circuit 470 from its VNEG terminal to its VPOS terminal should the voltage at the VPOS terminal be lower than the voltage at the VNEG terminal by more than a forward voltage drop. The addition of diode D0 becomes necessary when active-discharge circuit 470 is used for ESD protection and implemented in a technology where transistor M0 does not have a body diode or tub diode. If active-discharge circuit 470 is not used for ESD protection or if transistor M0 has a body diode or tub diode, then diode D0 may be optional.

When the input received at the third active-discharge terminal $V_{PDON}$ (see FIG. 5A) is logic-high, the output of a first inverter G1 turns off the N-type transistor M1. The P-type transistor M2 turns on both because of second inverter G2 and the fact that its source is biased high by the input received at third active-discharge terminal $V_{PDON}$. The P-type transistor M2 then pulls up on the gate of N-type transistor M0 and turns it on. This allows active-discharge circuit 470 to conduct current between its VPOS terminal and its VNEG terminal in either direction. It is this second biasing state that allows the active-discharge circuit 470 to conduct the inductor discharge current upon termination of charge pump 120 switching.

At some point during the second biasing state when the inductor current decreases to zero, having the active-discharge circuit 470 stay in the second biasing state will cause the inductor to charge again, but this time in the opposite direction. The current through the inductor will begin to increase, flowing from the output capacitor 104 into the third charge pump terminal 63, and from the VPOS terminal to the VNEG terminal. This can be an undesirable situation in the application as such reverse current flow through power converter 100 will discharge the output capacitor 104 upon termination of charge pump 120 switching. Therefore, some method of terminating the second biasing state for the active-discharge circuit 470 is necessary once the inductor current has been detected to have reached zero.

FIG. 5B shows an example of such a method using the current-sense circuit 472 as previously shown in FIG. 4. Current-sense circuit 472 includes a current-sense comparator 574, a logic-latch G3, a logic-OR gate G4 and an inverter G5. First and second current-sense terminals VPOS and VNEG connect to the positive and negative inputs V+ and V− of the current-sense comparator 574. The output of current-sense comparator 574, OUT, connects to a first input at logic-OR gate G4. The current-sense comparator 574 is enabled by a logic-high signal at its EN input, which connects to a third current-sense terminal $V_{OFF}$. The third current-sense terminal $V_{OFF}$ also connects to the SET input of logic-latch G3 and the input of inverter G5 while a fourth current-sense terminal $V_{PDON}$ connects to the Q output of logic-latch G3. The output of inverter G5 connects to a second input at logic-OR gate G4, while the output of logic-OR gate G4 connects to the RESET input of logic-latch G3. The first and second current-sense terminals VPOS, VNEG connect to the third and fourth charge pump terminals 63 and 64, respectively, as shown in FIG. 4.

When the input received at third current-sense terminal $V_{OFF}$ is logic-low, the current-sense comparator 574 is disabled and its output OUT is logic-low. The output of inverter G5 is logic-high, which causes the output of logic-OR gate G4 to also be logic-high. The SET input of logic-latch G3 is logic-low while its RESET input is logic-high, causing its Q output driving fourth current-sense terminal $V_{PDON}$ to be logic-low.

When the input received at third current-sense terminal $V_{OFF}$ is logic-high, the current-sense comparator 574 is enabled and senses the differential voltage across the first and second current-sense terminals VPOS and VNEG. The output of inverter G5 is logic-low, which causes the output of logic-OR gate G4 to depend solely on the output of current-sense comparator 574 for its polarity. The SET input of logic-latch G3 is logic-high while its RESET input is logic-low, causing its Q output driving the fourth current-sense terminal $V_{PDON}$ to be logic-high. If the voltage at the first current-sense terminal VPOS is lower or more negative than the voltage at the second current-sense terminal VNEG, the output of current-sense comparator 574 will be logic-low. If the voltage at the first current-sense terminal VPOS is equal to, higher or more positive than the voltage at the second current-sense terminal VNEG, the output of current-sense comparator 574 will be logic-high. This causes the output of logic-OR gate G4 and subsequently, the RESET input of logic-latch G3 to go logic-high, thereby resetting the Q output of logic-latch G3 and the output signal at fourth current-sense terminal $V_{PDON}$.

Turning back to the description of FIG. 4, both active-discharge circuit 470 and current-sense circuit 472 connect across the charge pump output to the third and fourth charge pump terminals 63 and 64. In addition to the control-signal path 460 sent from charge pump controller 466 to control the switches within cascade multiplier 405, charge pump controller 466 sends a first active-control signal $V_{OFF}$ to current-sense circuit 472, and receives a second active-control signal $V_{PDON}$ from current-sense circuit 472. In addition, current-sense circuit 472 also sends second active-control signal $V_{PDON}$ to the input of active-discharge circuit 470.

Similar methodology can be employed with alternate topologies of the cascade multiplier. For example, in response to receiving a command to terminate charge pump 120 (see FIG. 4) switching via an input signal at first controller input 25, charge pump controller 466 sends control signals along control-signal path 460 to open switches S1-S9 in later described FIG. 10 cascade multiplier 1005 (or later described FIG. 11 series-parallel 1105, or all the switches in later described FIG. 12 multi-level 1205). At the same time, charge pump controller 466 can send a logic-high first active-control signal $V_{OFF}$ to current-sense circuit 472, which enables the current-sense comparator 574 within, thus causing the current-sense circuit 472 to send a logic-high second active-control signal $V_{PDON}$ to both the active-discharge circuit 470 and charge pump controller 466. The transistor M0 (see FIG. 5A) within active-discharge circuit 470 turns on to form a discharge path for the inductor current, with the inductor current flowing from the fourth charge pump terminal 64 through active-discharge circuit 470 to third charge pump terminal 63. The differential voltage across the charge pump terminals 63 and 64 is such that the positive input V+ of the current-sense comparator 574 is lower or more negative than the negative input V−. The output of the current-sense comparator 574 remains logic-low and the second active-control signal $V_{PDON}$ remains logic-high under these conditions.

At some point when the inductor current decreases to zero, the differential voltage across the third and fourth charge pump terminals 63 and 64 will be equal to zero. This causes the output of the current-sense comparator 574 to transition from logic-low to logic-high, thereby causing the second active-control signal $V_{PDON}$ to transition from logic-high to logic-low, thus turning off transistor M0 within active-discharge circuit 470.

Figure 6:
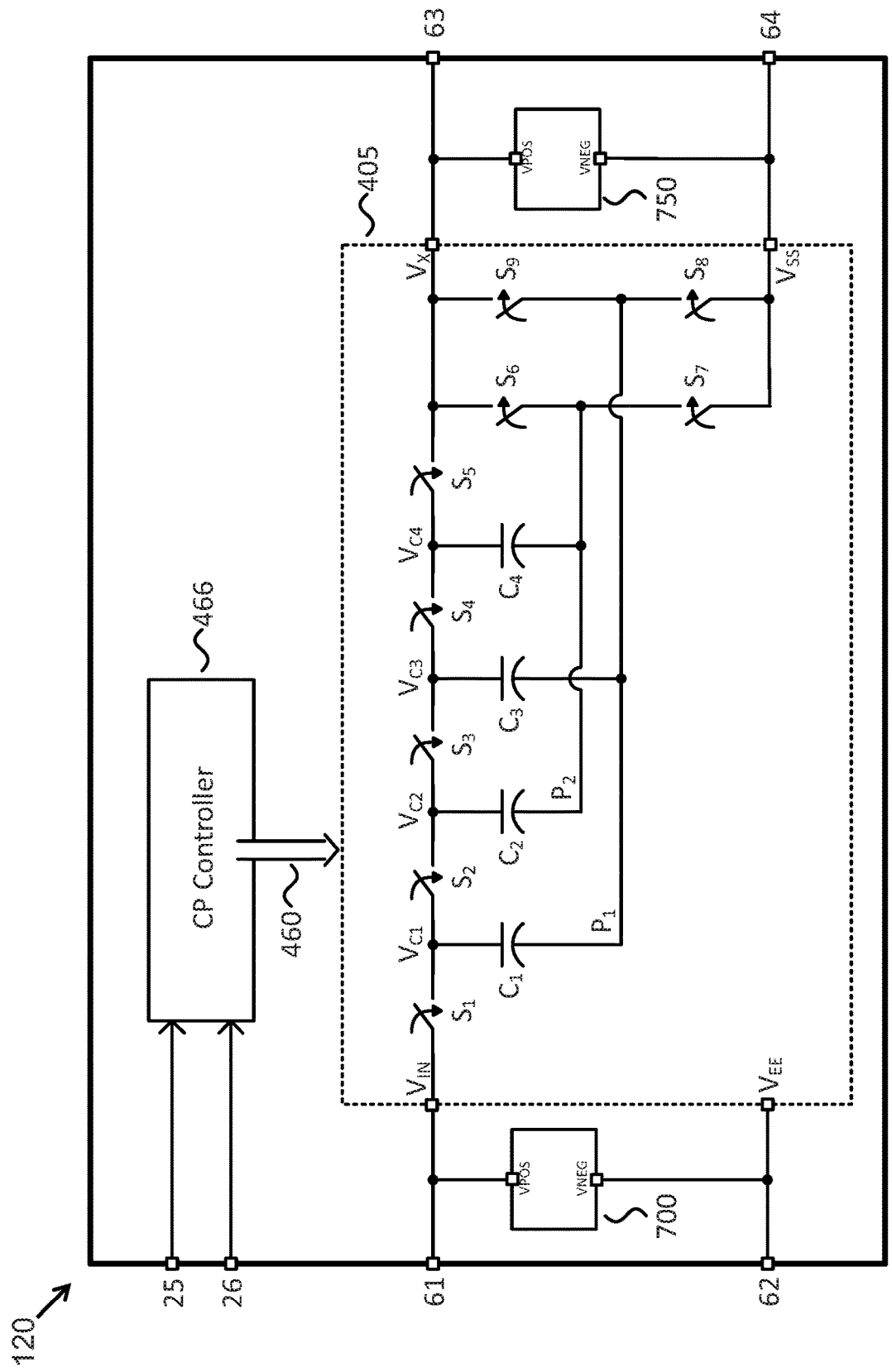
FIG. 6 shows a detailed schematic and block diagram for a charge pump in accordance with one embodiment of the disclosed method.

In FIG. 6, a charge pump 120 receives an input voltage across first and second charge pump terminals 61, 62 and produces an output voltage across third and fourth charge pump terminals 63, 64. The charge pump 120 includes a cascade multiplier 405, a charge pump controller 466, a first ESD protection block 700 and a second ESD protection block 750. In the illustrated embodiment, the cascade multiplier 405 is a single-phase symmetric cascade multiplier.

The cascade multiplier 405 includes first, second, third, fourth, and fifth stack-switches S1, S2, S3, S4, S5. Of these, the first, third, and fifth stack-switches S1, S3, S5 define a set of "odd stack-switches" and the second and fourth stack-switches S2, S4 define a set of "even stack-switches."

The cascade multiplier 405 also includes first and second low-side phase-switches S7, S8 as well first and second high-side phase-switches S6, S9. The first and second low-side phase-switches S7, S8 connect first and second phase-nodes P1, P2 to a second common node VSS that connects to the fourth charge pump terminal 64. The second charge pump terminal 62 connects to first common node VEE that typically shares the same voltage as second common node VSS, but can also be a different voltage in other embodiments. The first and second high-side phase-switches S6, S9 connect the first and second phase-nodes P1, P2 to an output node VX that connects to the third charge pump terminal 63. For convenience in discussing switching sequences, the first high-side phase-switch S6 and the second low-side phase-switch S8 will sometimes be referred to collectively as the "even phase-switches" and the first low-side phase-switch S7 and the second high-side phase-switch S9 will sometimes be referred collectively to as the "odd phase-switches."

The cascade multiplier 405 has four stages. The first stage includes the first stack-switch S1, a first stack-node VC1, and a first pump-capacitor C1; the second stage includes the second stack-switch S2, a second stack-node VC2 and a second pump-capacitor C2; the third stage includes the third stack-switch S3, a third stack-node VC3 and a third pump-capacitor C3; and the fourth stage includes the fourth stack-switch S4, a fourth stack-node VC4, and a fourth pump-capacitor C4.

In FIG. 6, the maximum voltage-transformation ratio is five because there are four stages. This means the input voltage received by charge pump 120 across first and second charge pump terminals 61, 62 is five times higher than the output voltage produced across third and fourth charge pump terminals 63, 64. The fifth stack-switch S5 connects the fourth stage to an output node VX that ultimately connects to the third charge pump terminal 63.

The first pump-capacitor C1 connects the first phase-node P1 to the first stack-node VC1; the third pump capacitor C3 connects the first phase-node P1 to the third stack-node VC3; the second pump capacitor C2 connects the second phase-node P2 to the second stack-node VC2; and the fourth pump capacitor C4 connects the second phase-node P2 to the fourth stack-node VC4.

In response to receiving one or more input signals at its first and second controller inputs 25, 26, a charge pump controller 466 places control signals on a control-signal path 460. These control signals cause the first, second, third, fourth, and fifth stack-switches S1, S2, S3, S4, S5, the first and second low-side phase-switches S7, S8, and the first and second high-side phase-switches S6, S9 to change states according to a specific sequence. As a result, the charge pump 120 repeatedly transitions between first and second operating-states at a specific frequency.

For example, during a first operating-state, the charge pump controller 466 closes the odd stack-switches S1, S3, S5, the first low-side phase-switch S7, and the second high-side phase-switch S9 and opens the even stack-switches S2, S4, the first high-side phase-switch S6, and the second low-side phase-switch S8. In contrast, during a second operating-state, the charge pump controller 466 opens the odd stack-switches S1, S3, S5, the first low-side phase-switch S7, and the second high-side phase-switch S9 and closes the even stack-switches S2, S4, the first high-side phase-switch S6 and the second low-side phase-switch S8.

A first ESD protection block 700 connects across the first and second charge pump terminals 61, 62 in order to channel the energy from an ESD event away from any switches and any circuitry within cascade multiplier 405. Similarly, a second ESD protection block 750 connects across the third and fourth charge pump terminals 63, 64 in order to channel the energy from an ESD event away from any switches and circuitry within cascade multiplier 405. Since the input voltage received by charge pump 120 across the first and second charge pump terminals 61, 62 is five times higher than the output voltage produced across the third and fourth charge pump terminals 63, 64, this typically requires different voltage ratings and implementations between the first and second ESD protection blocks 700 and 750.

Figure 7B:
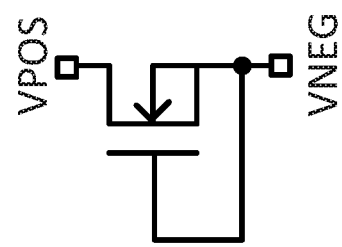
FIG. 7B shows a detailed schematic of another implementation of an ESD protection block used in the charge pump of FIG. 6.
Figure 7A:
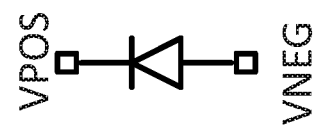
FIG. 7A shows a detailed schematic of an implementation of an electro-static discharge (ESD) protection block used in the charge pump of FIG. 6.

FIGS. 7A-7B show two possible implementations for the ESD protection blocks 700 and 750 in FIG. 6 (FIGS. 7A-7B also show two possible implementations for the ESD protection block 467 shown in FIG. 4). FIG. 7A shows a diode with its anode connected to the VNEG terminal of the ESD protection block 700 or 750, and its cathode connected to the VPOS terminal of the ESD protection block 700 or 750. The diode has a reverse breakdown-voltage rating that exceeds the maximum operating voltage across the charge pump terminals that it connects to. The diode's rating is designed in this way such that each of the ESD protection blocks 700 or 750 only conducts current either from its VPOS terminal to its VNEG terminal or from its VNEG terminal to its VPOS terminal during an ESD event, and does not conduct current within the expected normal operating voltage range. In the event that the voltage at the VPOS terminal may be lower than the voltage at the VNEG terminal by more than a forward voltage drop, there will be current flow through the ESD protection block 700 or 750 from its VNEG terminal to its VPOS terminal.

FIG. 7B shows another possible implementation of the ESD protection using an N-type MOSFET. The N-type MOSFET has its source, body and gate connected to the VNEG terminal, and its drain connected to the VPOS terminal of the ESD protection block 700 or 750. The N-type MOSFET has a drain-to-source breakdown voltage rating that exceeds the maximum operating voltage across the charge pump terminals that it connects to. The MOSFET's rating is designed in this way such that the ESD protection block 700 or 750 only conducts current either from its VPOS terminal to its VNEG terminal or from its VNEG terminal to its VPOS terminal during an ESD event, and does not conduct current within the expected normal operating voltage range. When fabricated using a conventional silicon process technology, the N-type MOSFET has an inherent body diode connected between its body terminal and its drain terminal. In the event that the voltage at the VPOS terminal may be lower than the voltage at the VNEG terminal by more than a forward voltage drop, there will be current flow through the ESD protection block 700 or 750 from its VNEG terminal to its VPOS terminal.

It will be understood by those skilled in the art that the ESD protection block 750 might get used as a possible discharge path for the inductor L using the ESD's diode path from VSS to VX during the shutdown of the charge pump. However, because the ESD protection block is ordinarily sized for human body model of 2000V, the ESD protection block may be too small to handle the inductor discharge from a load that could be in excess of 2 A.

Figure 8:
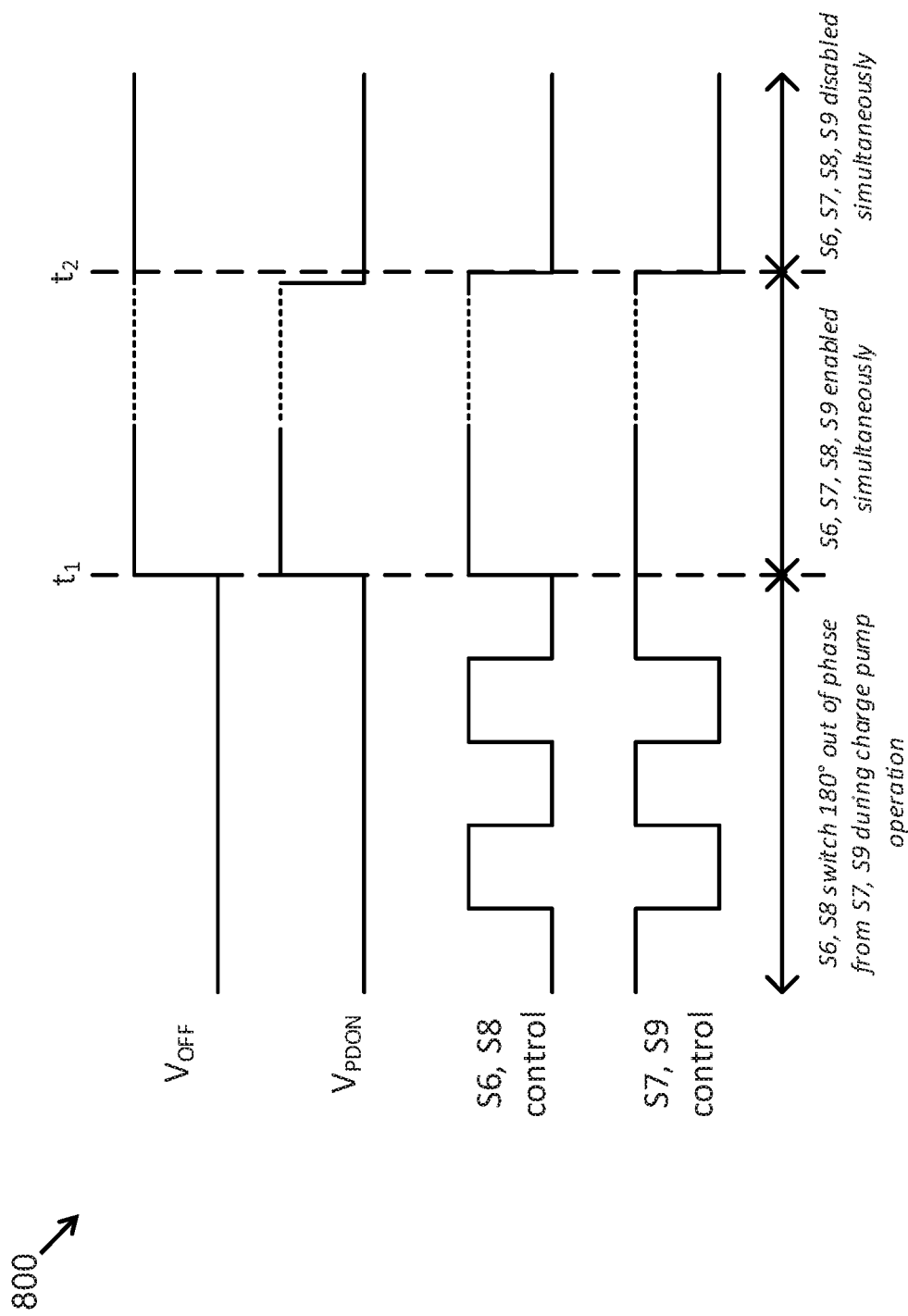
FIG. 8 shows a timing waveform of how the high-side and the low-side phase switches can be controlled in accordance with yet another embodiment of the disclosed method and apparatus.

In accordance with yet another embodiment of the disclosed method and apparatus, FIG. 6 and the below described FIG. 8 show an implementation of a solution regarding the path of discharging inductor current which efficiently, in terms of area and/or component count, shuts down the step-down adiabatic charge pump, which eliminates active-discharge circuit 470 and instead utilizes a shutdown control sequence applied to some of the control signals sent from charge pump controller 466 along control-signal path 460 to the cascade multiplier 405. In this embodiment, an existing pair of phase-switches, including a low-side phase-switch and a high-side phase-switch within the charge pump, is simultaneously enabled, thus causing a shoot-through condition. This pair of switches effectively acts like an active discharge switch.

FIG. 8 shows a method of how to time the opening and closing of these phase-switches within the cascade multiplier 405. FIG. 8 is an example of the shutdown control sequence that can be initiated in response to receiving a command to terminate charge pump 120 switching, beginning at time $t_1$.

In particular, FIG. 8 shows that phase-switches S6 and S7 are simultaneously enabled during the shutdown beginning at time $t_1$. This causes a shoot-through condition, which enables the rapid discharge of the inductor L current. In this mode, S6 and S7 are effectively operated like an active discharge switch. Therefore, the inductor current is safely discharged, and undesired ringing at node Vx is avoided. Phase-switches S8 and S9 can also be simultaneously enabled during the shutdown beginning at time $t_1$ to create a second parallel active discharge path for the inductor L current, but this is optional. At some point in time $t_2$ when the inductor L current is detected to have discharged to or near zero, the current-sense circuit 472 (see FIG. 4) will cause the second active-control signal $V_{PDON}$ to transition from logic-high to logic-low, thus turning off phase-switches S6 and S7 (and/or S8 and S9) in order to disable the active discharge.

Figure 9:
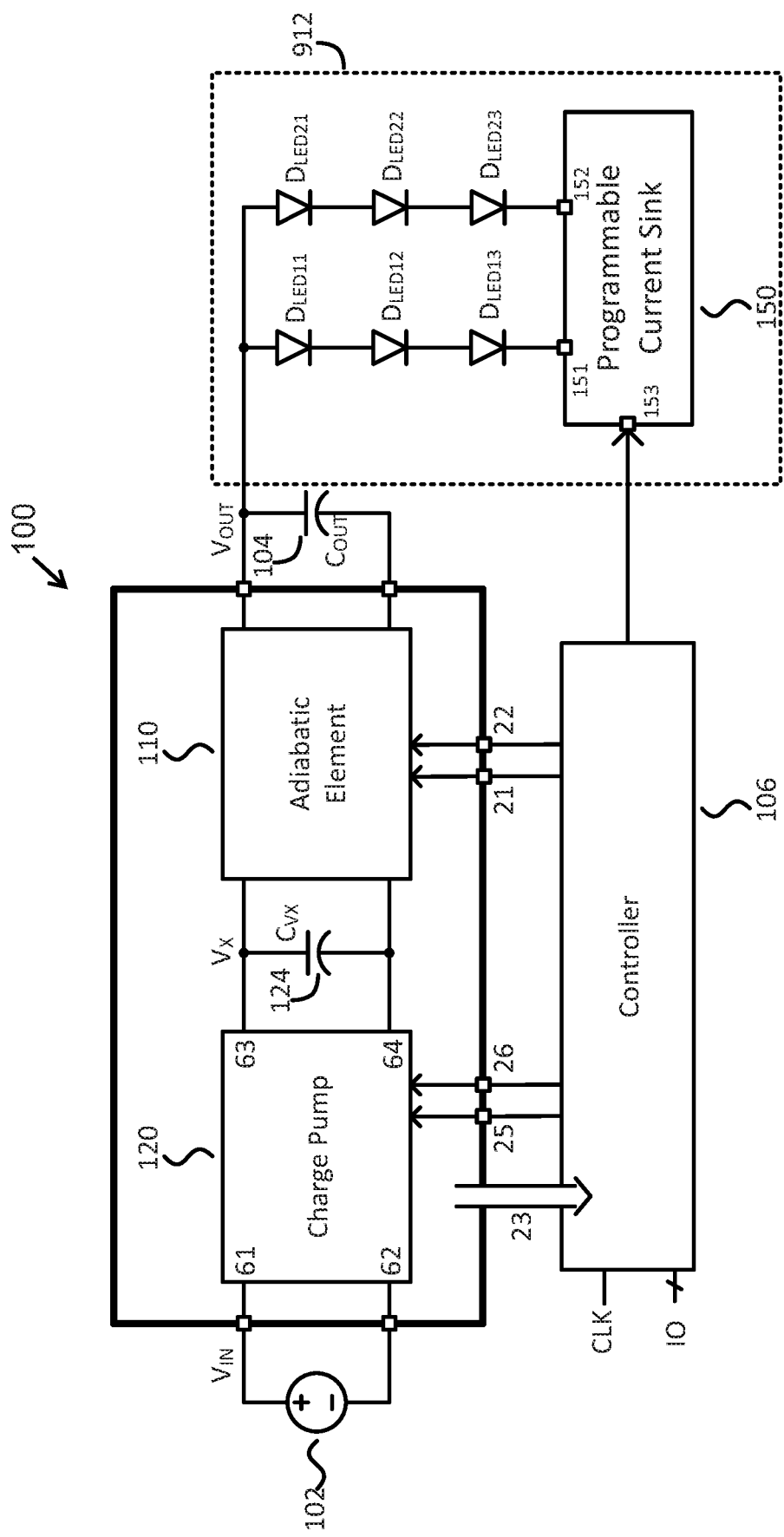
FIG. 9 shows an example of an LED driver application in accordance with yet an alternate embodiment of the disclosed method and apparatus.

FIG. 9 shows another implementation of an efficient, in terms of area and/or component count, shutdown of step-down adiabatic charge pump in accordance with yet an alternate embodiment of the disclosed method and apparatus. In this embodiment, the power converter 100 controls its own output load current. FIG. 9 shows an example of the FIG. 1 power converter used as a light-emitting-diode (LED) driver. The output load 912 includes a first LED string having $D_{LED11}$, $D_{LED12}$, $D_{LED13}$ in series, and a second LED string having $D_{LED21}$, $D_{LED22}$, $D_{LED23}$ in series. The first LED string connects between the power converter 100 output voltage VOUT and a programmable current sink 150 at first sink-terminal 151, while the second LED string connects between the power converter 100 output voltage VOUT and a programmable current sink 150 at second sink-terminal 152. The magnitude of the current drawn through each LED string by programmable current sink 150 is programmed by controller 106 along a control signal 153. The sum of the currents through both the first and second LED strings presents an output load to power converter 100. An LED driver application is one example where the power converter 100 controls its own output load 912.

In response to receiving a command to shut down the power converter 100 from one of the external signals IO, controller 106 sends one or more commands along the control signal 153 to programmable current sink 150 in order to decrease the magnitude of the currents drawn through each LED string to zero. Controller 106 may choose to decrease the currents in more than one step size or time step in order to minimize voltage transients at the output voltage VOUT. After controller 106 has programmed the currents to or near zero, controller 106 can then send a first control signal 25 to disable charge pump 120 switching.

Figure 10:
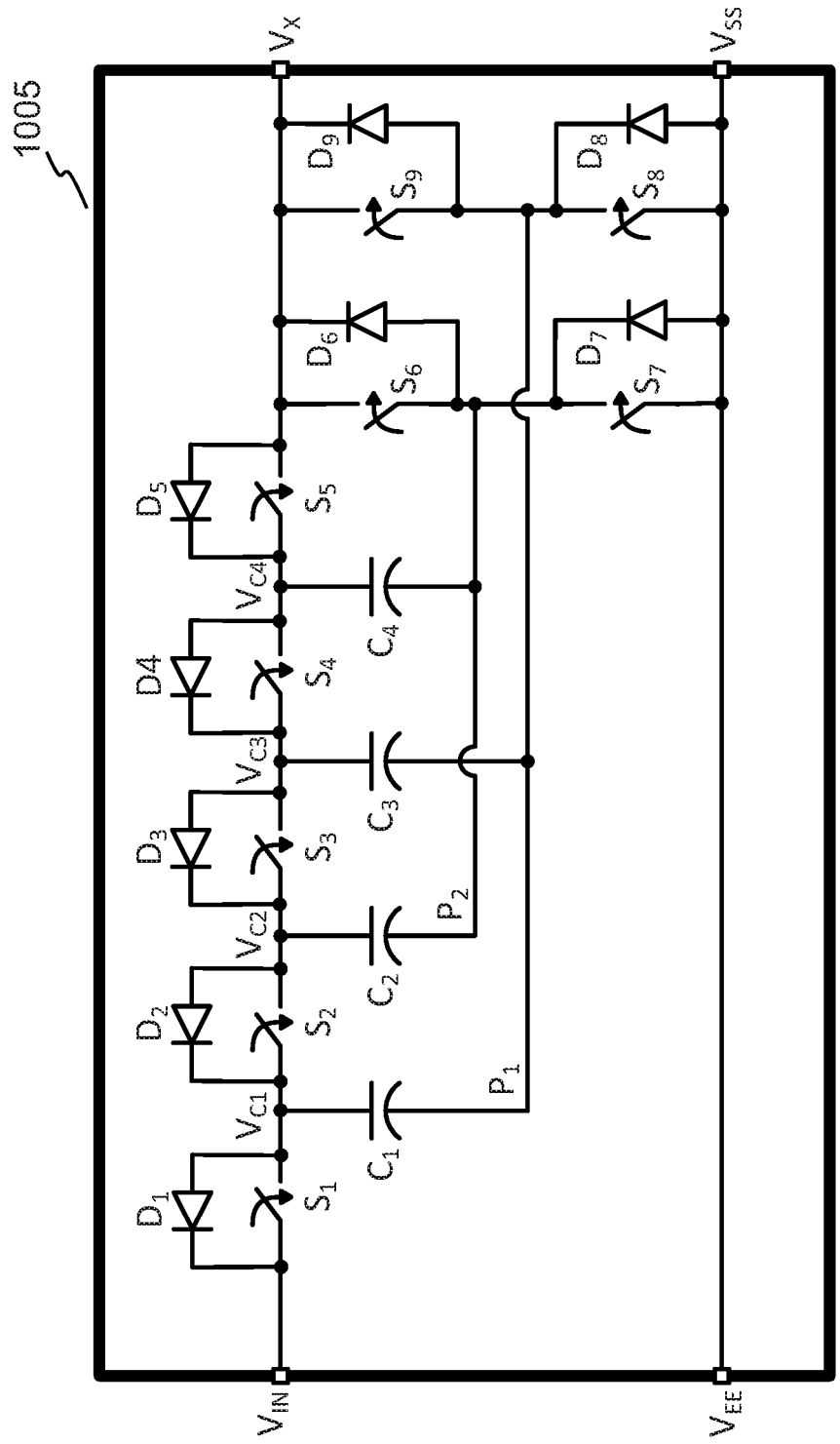
FIG. 10 shows a detailed schematic for a cascade multiplier used within the charge pump of FIG. 6, where the body diodes of MOSFET switches are shown.

FIG. 10 shows an embodiment 1005 of the cascade multiplier 405 within the charge pump 120 (already described in FIG. 4), where first, second, third, fourth, and fifth stack-switches S1, S2, S3, S4, S5, the first and second high-side phase-switches S6, S9, and the first and second low-side phase-switches S7, S8 are implemented using MOSFET transistors. In this embodiment, the first common node VEE shares the same voltage as second common node VSS since both nodes are connected together.

The FIG. 10 embodiment 1005 also assumes that the body and source terminals of each MOSFET transistor are connected together, in order to minimize on-resistance and die area while maximizing power efficiency. When fabricated using a conventional silicon process technology, each MOSFET transistor has an inherent body-diode across its source and drain terminals. A first body-diode D1 is associated with the first stack-switch S1, a second body-diode D2 is associated with the second stack-switch S2, a third body-diode D3 is associated with the third stack-switch S3, a fourth body-diode D4 is associated with the fourth stack-switch S4, a fifth body-diode D5 is associated with the fifth stack-switch S5, a sixth body-diode D6 is associated with the first high-side phase-switch S6, a seventh body-diode D7 is associated with the first low-side phase-switch S7, an eighth body-diode D8 is associated with the second low-side phase-switch S8, and a ninth body-diode D9 is associated with the second high-side phase-switch S9.

It can be seen in FIG. 10 that body diodes D6 to D9 could provide another possible path for the discharge of the inductor L current. Although the size of these body diodes is generally sufficient to handle the full inductor current for the particular application, the inductor current discharge path traverses through two body diodes connected in series between second common node VSS and output node VX, for example D6-D7 or D8-D9. Thus, this technique for discharging the inductor current may not be sufficiently effective because the ESD protection block 750 presents only a single diode, causing it to be the dominant inductor current discharge path despite its smaller size.

Figure 11:
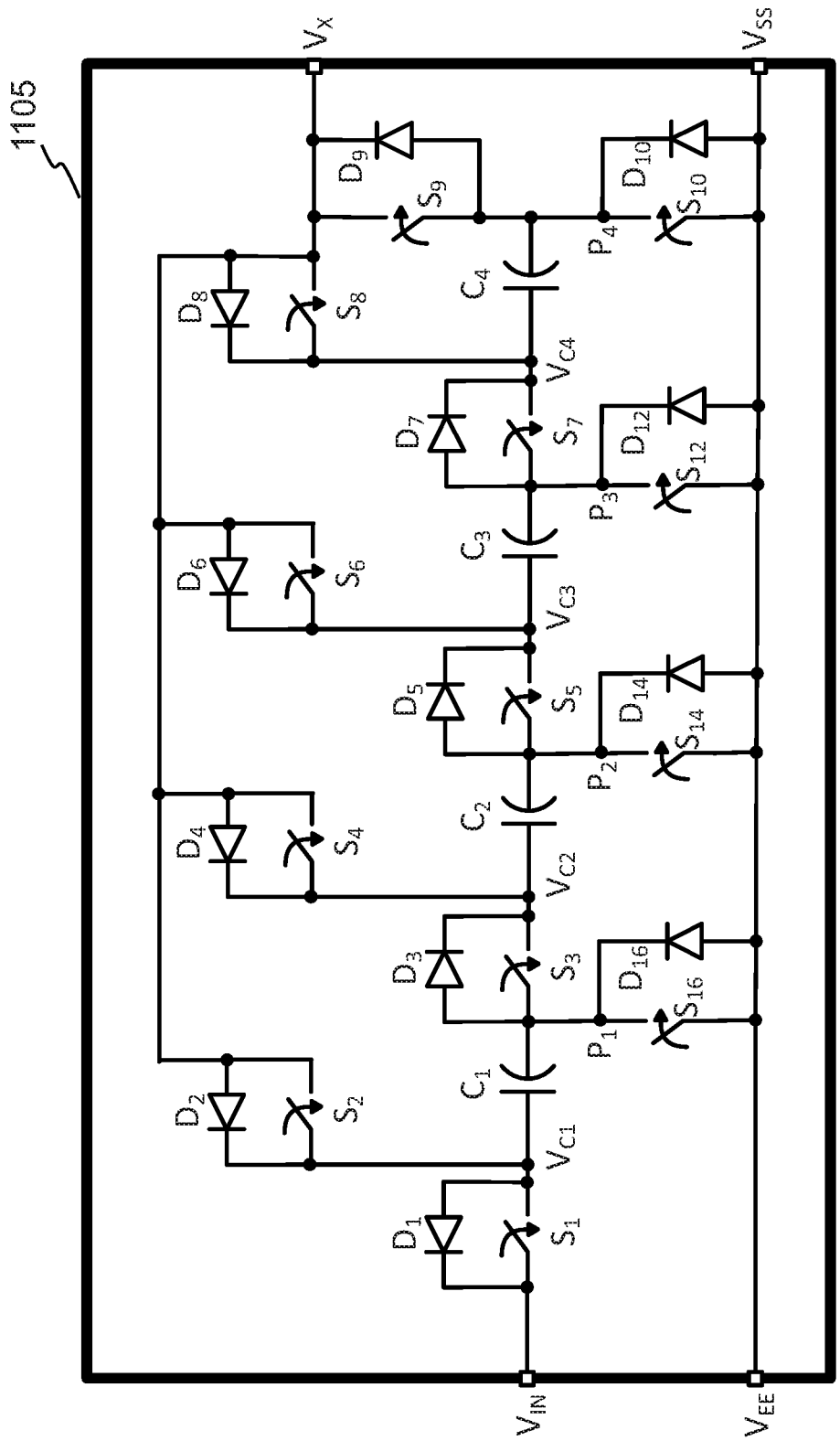
FIG. 11 shows a step-down series-parallel used within the charge pump of FIG. 6, where the body diodes of MOSFET switches are shown.

FIG. 11 shows an alternative embodiment 1105 for the cascade multiplier 405 that can be used within the charge pump 120 (already described in FIG. 4), that also has a voltage-transformation ratio of five from input to output. This alternate topology is also commonly known as a series-parallel topology. The series-parallel topology includes first, second, third, fourth, fifth, sixth, seventh, eighth and ninth stack-switches S1, S2, S3, S4, S5, S6, S7, S8, S9. Of these, the first, third, fifth, seventh and ninth stack-switches S1, S3, S5, S7, S9 define a set of "odd stack-switches" and the second, fourth, sixth and eighth stack-switches S2, S4, S6, S8 define a set of "even stack-switches."

The series-parallel topology 1105 also includes first, second, third and fourth phase-switches S10, S12, S14, S16. The first, second, third and fourth phase-switches S10, S12, S14, S16 connect first, second, third and fourth phase-nodes P1, P2, P3, P4 to first and second common nodes VEE, VSS.

The series-parallel topology 1105 has four stages. The first stage includes the first and second stack-switches S1-S2, a first stack-node VC1, and a first pump-capacitor C1; the second stage includes the third and fourth stack-switches S3-S4, a second stack-node VC2 and a second pump-capacitor C2; the third stage includes the fifth and sixth stack-switches S5-S6, a third stack-node VC3 and a third pump-capacitor C3; and the fourth stage includes the seventh and eighth stack-switches S7-S8, a fourth stack-node VC4, and a fourth pump-capacitor C4. The ninth stack-switch S9 connects the fourth stage to an output node VX.

The first pump-capacitor C1 connects the first phase-node P1 to the first stack-node VC1; the second pump capacitor C2 connects the second phase-node P2 to the second stack-node VC2; the third pump capacitor C3 connects the third phase-node P3 to the third stack-node VC3; and the fourth pump capacitor C4 connects the fourth phase-node P4 to the fourth stack-node VC4.

In response to receiving one or more input signals at its first and second controller inputs 25, 26 (see FIG. 6), a charge pump controller 466 places control signals on a control signal path 460. These control signals cause the first, second, third, fourth, fifth, sixth, seventh, eighth and ninth stack-switches S1, S2, S3, S4, S5, S6, S7, S8, S9, as well as the first second, third and fourth phase-switches S10, S12, S14, S16 to change states according to a specific sequence. As a result, the charge pump 120 repeatedly transitions between first and second operating-states at a specific frequency.

For example, during a first operating-state, the charge pump controller 466 closes the odd stack-switches S1, S3, S5, S7, S9 and opens the even stack-switches S2, S4, S6, S8 as well as the first second, third and fourth phase-switches S10, S12, S14, S16. In contrast, during a second operating-state, the charge pump controller 466 opens the odd stack-switches S1, S3, S5, S7, S9 and closes the even stack-switches S2, S4, S6, S8 as well as the first second, third and fourth phase-switches S10, S12, S14, S16.

FIG. 11 also shows the series-parallel topology 1105 having all stack-switches and phase-switches implemented using MOSFET transistors. The FIG. 11 series-parallel embodiment 1105 also assumes that the body and source terminals of each MOSFET transistor are connected together, in order to minimize on-resistance and die area while maximizing power efficiency. When fabricated using a conventional silicon process technology, each MOSFET transistor has an inherent body-diode across its source and drain terminals. A first body-diode D1 is associated with the first stack-switch S1, a second body-diode D2 is associated with the second stack-switch S2, a third body-diode D3 is associated with the third stack-switch S3, a fourth body-diode D4 is associated with the fourth stack-switch S4, a fifth body-diode D5 is associated with the fifth stack-switch S5, a sixth body-diode D6 is associated with the sixth stack-switch S6, a seventh body-diode D7 is associated with the seventh stack-switch S7, an eighth body-diode D8 is associated with the eighth stack-switch S8, and a ninth body-diode D9 is associated with the ninth stack-switch S9. Similarly, body-diode D10 is associated with first phase-switch S10, body-diode D12 is associated with second phase-switch S12, body-diode D14 is associated with third phase-switch S14, and body-diode D16 is associated with fourth phase-switch S16.

It can be seen in FIG. 11 that body diodes D9 and D10 could provide another possible path for the discharge of the inductor L current. Although the size of these body diodes is generally sufficient to handle the full inductor current for the particular application, the inductor current discharge path traverses through two body diodes D9 and D10, compared to a single diode in ESD protection block 750. Thus, this technique for discharging the inductor current may not be sufficiently effective since the single-diode path through ESD protection block 750 causes it to be the dominant inductor current discharge path.

Figure 12:
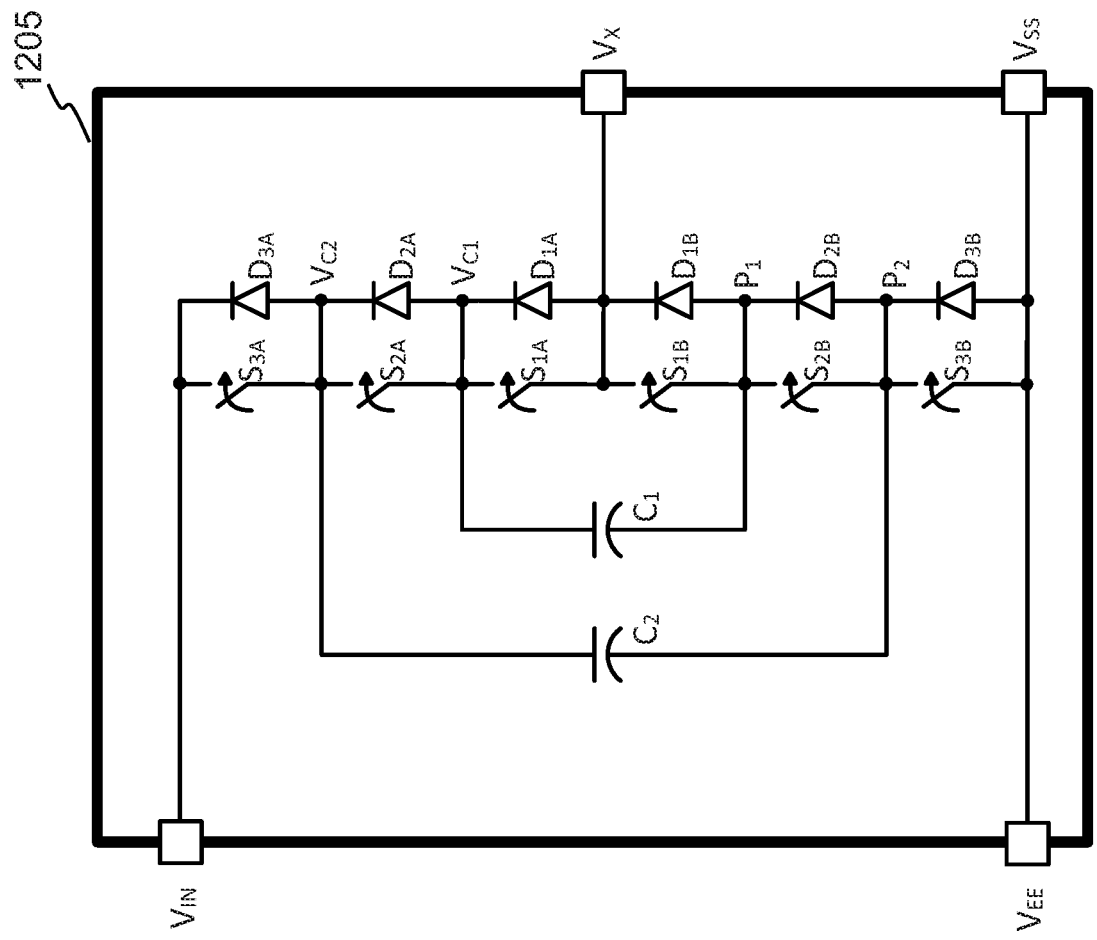
FIG. 12 shows a step-down multi-level used within the charge pump of FIG. 6, where the body diodes of MOSFET switches are shown.

FIG. 12 shows an alternative implementation 1205 for the cascade multiplier 405 that can be used within the charge pump 120 (already described in FIG. 4), but this time with a minimum voltage-transformation ratio of three from input to output. This alternate topology is also commonly known as a multi-level topology. The multi-level topology includes first, second, and third stack-switches S1A, S2A, S3A as well as first, second, and third phase-switches S1B, S2B, S3B.

The FIG. 12 multi-level topology has two stages. The first stage includes the first stack-switch S1A, a first stack-node VC1, and a first pump-capacitor C1; the second stage includes the second stack-switch S2A, a second stack-node VC2 and a second pump capacitor C2; the third stack-switch S3A connects the second stage to an input node VIN.

The first pump capacitor C1 connects the first phase-node P1 to the first stack-node VC1; the second pump capacitor C2 connects the second phase-node P2 to the second stack-node VC2. When closed, the first phase-switch S1B connects the first phase-node P1 to an output node VX. When closed, the second phase-switch S2B connects the first phase-node P1 to the second phase-node P2. When closed, the third phase-switch S3B connects the second phase-node P2 to first and second common nodes VEE, VSS.

In response to receiving one or more input signals at its first and second controller inputs 25, 26 (see FIG. 6), a charge pump controller 466 places control signals on a control signal path 460. These control signals cause the first, second, and third stack-switches S1A, S2A, S3A as well as the first, second, and third phase-switches S1B, S2B, S3B to change states according to a specific sequence. As a result, the charge pump 120 repeatedly transitions between several operating-states at a specific frequency and in a specific sequence.

For example, during a first operating state, the charge pump controller 466 closes the third stack-switch S3A and the first and second phase-switches S1B, S2B while opening stack-switches S1A, S2A as well as the third phase-switch S3B. During a second operating-state, the charge pump controller 466 closes the second stack-switch S2A and the first and third phase-switches S1B, S3B while opening stack-switches S1A, S3A as well as the second phase-switch S2B. During a third operating state, the charge pump controller 466 closes the first stack-switch S1A and the second and third phase-switches S2B, S3B while opening stack-switches S2A, S3A as well as the first phase-switch S1B. More operating states are possible and alternate sequences of these operating states are also possible.

FIG. 12 also shows the multi-level topology 1205 having all stack-switches and phase-switches implemented using MOSFET transistors. FIG. 12 multi-level 1205 also assumes that the body and source terminals of each MOSFET transistor are connected together, in order to minimize on-resistance and die area while maximizing power efficiency. When fabricated using a conventional silicon process technology, each MOSFET transistor has an inherent body-diode across its source and drain terminals. A first body-diode D1A is associated with the first stack-switch S1A, a second body-diode D2A is associated with the second stack-switch S2A, and a third body-diode D3A is associated with the third stack-switch S3A. Similarly, body-diode D1B is associated with first phase-switch S1B, body-diode D2B is associated with second phase-switch S2B, and body-diode D3B is associated with third phase-switch S3B.

It can be seen in FIG. 12 that body diodes D1B, D2B and D3B could provide another possible path for the discharge of the inductor L current. Although the size of these body diodes is generally sufficient to handle the full inductor current for the particular application, the inductor current discharge path traverses through three body diodes D1B, D2B and D3B. Thus, this technique in this topology for discharging the inductor current makes this issue worse because of the three diode voltage drops. This is also the case for a 4-stage multi-level, where the problem worsens with five series body diodes in the discharge path.

It will be understood by those skilled in the art that the shutdown method disclosed in paragraphs 72-74 is also applicable to the embodiments in FIG. 11 and FIG. 12.

In the FIG. 11 series-parallel embodiment 1105, S9 switches 180° out of phase from S10 during charge pump operation. Between time $t_1$ and time $t_2$, S9 and S10 are closed simultaneously to form an active discharge path for the inductor current. Once the inductor current is detected to have discharged to or near zero, S9 and S10 are opened to remove the active discharge path.

In the FIG. 12 multi-level topology 1205, S1B, S2B and S3B are never all closed simultaneously during charge pump operation. Between time $t_1$ and time $t_2$, S1B, S2B and S3B are closed simultaneously to form an active-discharge path for the inductor current. Once the inductor current is detected to have discharged to or near zero, at least one of S1B, S2B or S3B are opened in order to remove the active discharge path.

In the below described FIGS. 13-14, a general description of MOSFET silicon technology, MOSFET silicon-on-insulator technology, HEMT gallium-arsenide technology, and HEMT gallium-nitride technology is provided in order to present the difference between these technologies as is related to the transistor body/tub diode. The fact that some technologies lack body/tub diodes would make it a requirement to have as solutions the disclosed methods and apparatus, in order to mitigate the issues surrounding the shutdown of step-down adiabatic charge pumps.

Figures 13A, 13B:
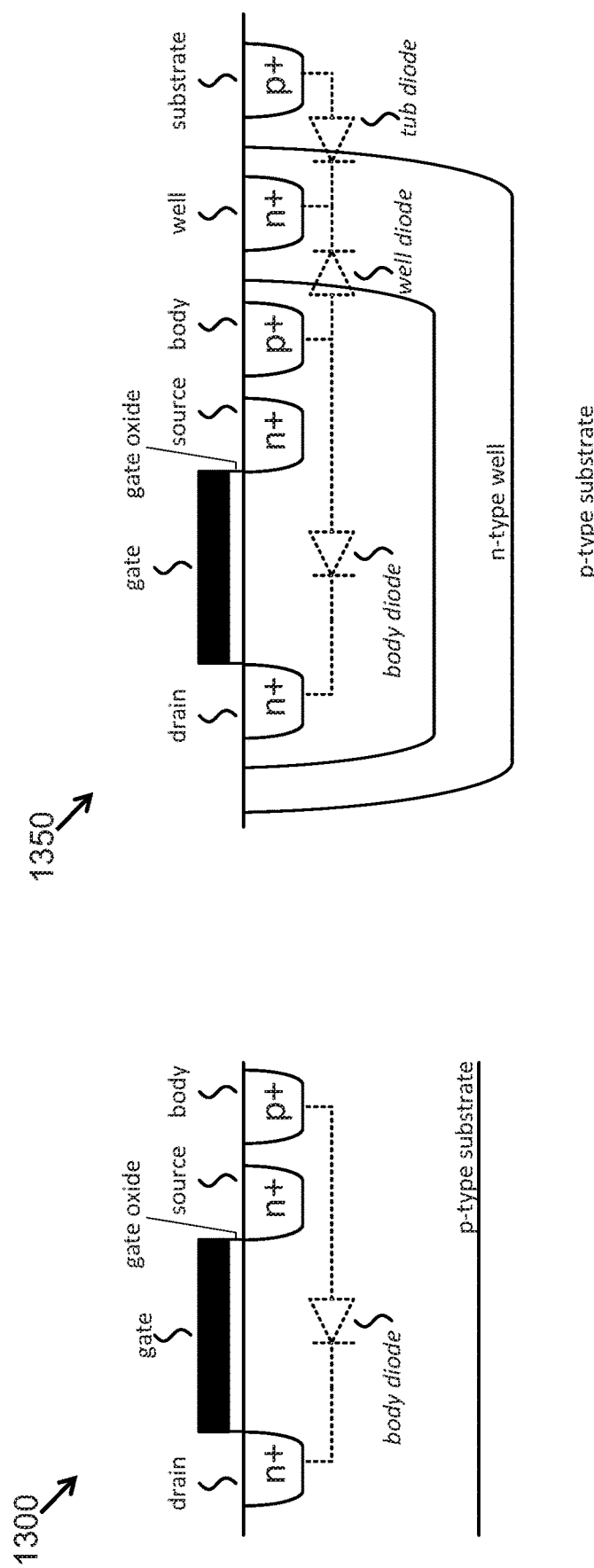
FIG. 13A shows a cross-section of an n-type MOSFET in a p-type silicon substrate.
FIG. 13B shows a cross-section of an n-type MOSFET in a p-type well isolated from a p-type silicon substrate by an n-type well.

FIG. 13A shows a cross-section of an n-type metal-oxide-semiconductor field-effect transistor (MOSFET) residing directly in a p-type silicon substrate. The structure is obtained by growing a layer of silicon dioxide on top of a silicon substrate and depositing a layer of metal or polycrystalline silicon to form a gate terminal above an insulating gate oxide. The MOSFET includes source and drain terminals, each connected to highly-doped regions of the same type, that are separated by a body region of an opposite type or doping. An n-type MOSFET as shown in FIG. 13A has highly-doped n-type or n+ source and drain regions, with a p-type body region that connects to a body terminal. Application of sufficient voltage at the gate terminal relative to the source terminal creates an electric field that promotes a conducting channel underneath the gate oxide and between the source and drain regions, through which current flow occurs. In FIG. 13A, the p-type body region is also the p-type silicon substrate in which the n-type MOSFET resides.

The n+ source and drain regions with the p-type body region form two p-n junctions, the first between the drain and body regions, and the second between the source and body regions. Each p-n junction behaves like a diode in allowing current flow in one direction while blocking current flow in a reverse direction, depending on the voltage bias and voltage polarity across the p-n junction. The anode of the p-n junction diode is the p-type body region while the cathode is the n+ drain region or source region. FIG. 13A shows the first p-n junction diode between the drain and body regions, labeled as body diode. The second p-n junction diode between the source and body regions is omitted as it is electrically inactive due to a commonly used electrical shorting connection applied between the source and body terminals, especially when the MOSFET is used as a switch.

FIG. 13B shows the cross-section of an n-type MOSFET, residing in an n-type well within a p-type silicon substrate. Some advance silicon processes include such wells to allow the MOSFET to be electrically isolated from the p-type substrate. It should be noted that the electrical isolation is achieved through additional p-n junctions that are to be reverse-biased. Similar to FIG. 13A, there are first and second p-n junction diodes between the drain and body, as well as source and body regions of the n-type MOSFET, with the second p-n junction diode not shown since it is also assumed to be electrically inactive. This time, a third p-n junction diode, labeled as "well" diode, is formed between the p-type body region and the n-type well. In addition, a fourth p-n junction diode, labeled as tub diode, is formed between the n-type well and the p-type substrate. As previously mentioned, proper electrical isolation of the n-type MOSFET from the p-type substrate can only occur if the well diode and tub diodes are reverse biased to prevent current flow between the n-type MOSFET and the p-type substrate. This means the voltage at the well terminal should be equal to or higher than the voltage at the body terminal, as well as the voltage of the p-type substrate. It is also possible to bias the n-type well to the same voltage as the drain terminal of the n-type MOSFET, which effectively makes the well diode operate in parallel with the body diode, while electrically connecting the tub diode between the p-type substrate and the drain terminal of the n-type MOSFET.

It will be understood by those skilled in the art that the tub diode in FIG. 13B can provide a path to carry the inductor discharge current. The size of the tub diode is inherently proportional to the size of the MOSFET, thus the tub diode has the ability to provide a path for the discharge current of the inductor, since the MOSFET is already sized for the load current in the application.

FIG. 14A shows the cross-section of an n-type MOSFET in a silicon-on-insulator (SOI) process. Buried oxide is a layer formed on top of a substrate that can be silicon similar to that of FIGS. 13A-13B, or can be sapphire. Buried oxide isolates substrate from the n+ source and drain regions, which are formed on top of buried oxide. The transistor conducts when a conducting channel forms in the channel region under the gate and gate oxide, upon application of a sufficient voltage difference across the gate to source. The channel region is a silicon region that has an opposite doping from the source/drain regions, such as p-type for an NMOS transistor and n-type for a PMOS transistor. The conducting channel consists of electric carriers flowing between the source and drain regions in the channel region. A non-conducting depletion region may form under the conducting channel in the channel region in a partially-depleted device. In a fully-depleted device, the entire channel region is depleted.

The absence of a body region that can support electric carrier flow in either the partially-depleted or fully-depleted SOI transistor prevents the formation of a body diode, unlike the non-SOI transistors of FIGS. 13A-13B. Furthermore, the buried oxide is an electrical insulator that prevents current flow between the substrate and the source and drain regions.

The buried oxide therefore further eliminates the formation of a well or tub diode, unlike the non-SOI transistor of FIG. 13B.

There are many types of high electron mobility transistors (HEMT), FIGS. 14B-14C show two variants.

A HEMT is a field-effect transistor incorporating a junction between two materials with different band gaps (i.e. a heterojunction) as the channel instead of a doped region (as is generally the case for MOSFET). To allow conduction, semiconductors are doped with impurities which donate either mobile electrons or holes. However, these electrons are slowed down through collisions with the impurities (dopants) used to generate them in the first place. HEMTs avoid this through the use of high mobility electrons generated using the heterojunction of a highly doped wide-bandgap n-type donor-supply layer (AlGaAs in FIG. 14B) and a non-doped narrow-bandgap channel layer with no dopant impurities (GaAs in FIG. 14B).

The electrons generated in the thin n-type AlGaAs layer drop completely into the GaAs layer to form a depleted AlGaAs layer, because the heterojunction created by different band-gap materials forms a quantum well (a steep canyon) in the conduction band on the GaAs side where the electrons can move quickly without colliding with any impurities because the GaAs layer is undoped, and from which they cannot escape. The effect of this is to create a very thin layer of highly mobile conducting electrons with very high concentration, giving the channel very low resistivity (or to put it another way, "high electron mobility"). These accumulated electrons are also known as 2DEG or two-dimensional electron gas.

Because of the very high electron mobility of the 2DEG, these devices can provide higher performance devices than silicon devices that rely upon an inversion channel with low mobility due to scattering. Another benefit is the higher band gap of these materials (GaAs=1.42 eV, GaN=3.4 eV) vs. 1.12 eV for silicon. The larger band gap results in a higher breakdown field, so a for a given length of material, these materials can withstand a larger voltage gradient (or electric field) without undergoing avalanche breakdown, resulting higher performance devices when compared to silicon.

FIG. 14B shows a depletion-mode GaAs HEMT. The device features a recessed schottky gate and an AlGaAs/GaAs 2DEG channel. This device will conduct when zero volts is applied to the gate and will stop conducting when a sufficiently negative voltage is applied to the gate. FIG. 14C shows an enhancement-mode GaN HEMT. This device features a p-type gate, recessed ohmic drain/source contacts (i.e., they cut through the AlGaN layer), and an AlGaN/GaN 2DEG channel. This device will conduct when a sufficiently positive voltage is applied to the gate and will stop conducting when zero volts is applied to the gate.

It will be understood by those skilled in the art that GaAs and GaN transistors inherently lack a body diode, or a tub/well diode. Therefore, implementations of adiabatic charge pumps in these technologies will need to utilize the method and apparatus disclosed herein in order to avoid the issues related to the discharge of the inductor current.

As should be readily apparent to one of ordinary skill in the art, various embodiments of the invention can be implemented to meet a wide variety of specifications. Unless otherwise noted above, selection of suitable component values is a matter of design choice and various embodiments of the invention may be implemented in any suitable IC technology (including but not limited to MOSFET structures), or in hybrid or discrete circuit forms. Integrated circuit embodiments may be fabricated using any suitable substrates and processes, including but not limited to standard bulk silicon, silicon-on-insulator (SOI), and silicon-on-sapphire (SOS). Unless otherwise noted above, the invention may be implemented in other transistor technologies such as bipolar, GaAs HBT, GaN HEMT, GaAs pHEMT, and MESFET technologies. Fabrication in CMOS on SOI or SOS processes enables circuits with low power consumption, the ability to withstand high power signals during operation due to FET stacking, good linearity, and high frequency operation (i.e., radio frequencies up to and exceeding 50 GHz). Monolithic IC implementation is particularly useful since parasitic capacitances generally can be kept low (or at a minimum, kept uniform across all units, permitting them to be compensated) by careful design.

Voltage levels may be adjusted, or voltage and/or logic signal polarities reversed depending on a particular specification and/or implementing technology (e.g., NMOS, PMOS, or CMOS, and enhancement mode or depletion mode transistor devices). Component voltage, current, and power handling capabilities may be adapted as needed, for example, by adjusting device sizes, serially "stacking" components (particularly FETs) to withstand greater voltages, and/or using multiple components in parallel to handle greater currents. Additional circuit components may be added to enhance the capabilities of the disclosed circuits and/or to provide additional functional without significantly altering the functionality of the disclosed circuits.

The term "MOSFET", as used in this disclosure, means any field effect transistor (FET) with an insulated gate and comprising a metal or metal-like, insulator, and semiconductor structure. The terms "metal" or "metal-like" include at least one electrically conductive material (such as aluminum, copper, or other metal, or highly doped polysilicon, graphene, or other electrical conductor), "insulator" includes at least one insulating material (such as silicon oxide or other dielectric material), and "semiconductor" includes at least one semiconductor material.

A number of embodiments of the invention have been described. It is to be understood that various modifications may be made without departing from the spirit and scope of the invention. For example, some of the steps described above may be order independent, and thus can be performed in an order different from that described. Further, some of the steps described above may be optional. Various activities described with respect to the methods identified above can be executed in repetitive, serial, or parallel fashion.

Various features, aspects, and embodiments of switched-capacitor power-converters have been described herein. The features, aspects, and numerous embodiments described are susceptible to combination with one another as well as to variation and modification, as will be understood by those having ordinary skill in the art. The present disclosure should, therefore, be considered to encompass such combinations, variations, and modifications.

Additionally, the terms and expressions that have been employed herein are used as terms of description and not of limitation. There is no intention, in the use of such terms and expressions, of excluding any equivalents of the features shown and described, or portions thereof. It is recognized that various modifications are possible within the scope of the claims. Other modifications, variations, and alternatives are also possible. Accordingly, the claims are intended to cover all such equivalents.

It is to be understood that the foregoing description is intended to illustrate and not to limit the scope of the invention, which is defined by the scope of the following claims, and that other embodiments are within the scope of the claims.

What is claimed is:

1. A power converter, comprising:
  a charge pump configured to operate according to an enabled switching state and a disabled switching state;
  an inductor having a first terminal and a second terminal, the first terminal connected to the charge pump and the second terminal configured to be connected to an output load; and
  a switch element connected across the inductor, the switch element configured to:
    close during the disabled switching state of the charge pump, and
    open during the enabled switching state of the charge pump.

2. The power converter of claim 1, further comprising a first capacitor, the first capacitor configured to provide an output voltage to the output load.

3. The power converter of claim 1, wherein the switch element is configured to be closed prior to disabling a switching of the charge pump.

4. The power converter of claim 1, wherein the switch element is configured to be closed concurrently with disabling a switching of the charge pump.

5. The power converter of claim 1, wherein the switch element comprises a GaAs transistor.

6. The power converter of claim 1, wherein the switch element comprises a GaN transistor.

7. A charge pump comprising:
  first and second input terminals configured to receive an input voltage to the charge pump;
  third and fourth input terminals configured to output an output voltage of the charge pump based on the input voltage;
  an active discharge circuit connected across the third and fourth terminals of the charge pump; and
  a current-sense circuit connected across the third and fourth terminals of the charge pump, the current-sense circuit configured to be driven by a controller based on a sense status signal generated by the current-sense circuit, the current-sense circuit further configured to correspondingly activate the active discharge circuit.

8. The charge pump of claim 7, wherein the active discharge circuit further comprises:
  a first inverter and a second inverter configured to receive a driving signal;
  a high-side switch element connected to the first inverter;
  a low-side switch element connected to the second inverter, the high-side switch element connected to the low-side switch element; and
  a clamping switch element for the charge pump having an input connected to the high-side switch element and the low-side switch element, a first output serving as a clamping switch element anode and a second output serving as a clamping switch element cathode.

9. The charge pump of claim 8, further comprising a diode having its anode connected to the first output of the clamping switch element and its cathode connected to the second output of the clamping switch element.

10. The charge pump of claim 7, wherein the current-sense circuit further comprises:
  a first inverter configured to receive a control signal;
  a latch having its set terminal connected to the to the first inverter; and
  a current-sense comparator configured to receive the control signal, the current-sense comparator further configured to provide an output signal to an OR gate, wherein the latch provides an output signal in response to the control signal and the output of the OR gate.

11. The charge pump of claim 8, wherein the high-side switch element and the low-side switch element comprise GaAs transistors.

12. The charge pump of claim 8, wherein the high-side switch element and the low-side switch element comprise GaN transistors.

13. A charge pump, comprising:
  a controller; and
  a cascade multiplier having a plurality of high side and low side switches,
  wherein
  the controller is configured to receive an external signal and to correspondingly drive the plurality of high side and low side switches in the cascade multiplier,
  a first high side switch and a first low side switch from the plurality of high side and low side switches are enabled simultaneously, such that the first high side switch and the first low side switch act as an active discharge switch for the charge pump, and
  the first high side switch and the first low side switch are coupled to a first phase node of the cascade multiplier.

14. The charge pump of claim 13, wherein
  a second high side switch and a second low side switch from the plurality of high side and low side switches are enabled simultaneously, such that the first high side and low side switches and the second high side and low side switches act as an active discharge switch for the charge pump, and
  the second high side and low side switches are coupled to a second phase node of the cascade multiplier that is different from the first phase node.

15. The charge pump of claim 13, further comprising a first electro-static discharge element.

16. The charge pump of claim 15, further comprising a second electro-static discharge element.

17. The charge pump of claim 15, wherein the first electro-static discharge element comprises a diode.

18. The charge pump of claim 15, wherein the first electro-static discharge element comprises a MOSFET.

19. The charge pump of claim 16, wherein the second electro-static discharge element comprises a diode.

20. The charge pump of claim 16, wherein the second electro-static discharge element comprises a MOSFET.

21. The charge pump of claim 14, further comprising a first electro-static discharge element.

22. The charge pump of claim 21, further comprising a second electro-static discharge element.

23. The charge pump of claim 13, wherein the plurality of high side and low side switches in the cascade multiplier comprises GaAs transistors.

24. The charge pump of claim 13, wherein the plurality of high side and low side switches in the cascade multiplier comprises GaN transistors.

25. A method to shut down a charge pump, the method comprising:
  providing a charge pump;
  coupling an adiabatic element to the charge pump;
  coupling an output load the adiabatic element, the output load comprising a programmable current sink circuit; and shutting down the charge pump by:
  i) controlling the programmable current sink circuit to reduce a current drawn through the output load; and
  ii) based on the controlling, controlling the charge pump to disable switching.

26. The method according to claim 25, wherein the output load comprises a plurality of light emitting diodes.

27. The method according to claim 25, wherein the output load comprises a plurality of light emitting diodes connected in series.

* * * * *